United States Patent
Yamashita

(10) Patent No.: US 9,094,932 B2
(45) Date of Patent: *Jul. 28, 2015

(54) MOBILE ELECTRONIC DEVICE

(71) Applicant: KYOCERA CORPORATION, Kyoto-shi, Kyoto (JP)

(72) Inventor: Reiko Yamashita, Gifu (JP)

(73) Assignee: KYOCERA CORPORATION, Kyoto (JP)

( * ) Notice: Subject to any disclaimer, the term of this patent is extended or adjusted under 35 U.S.C. 154(b) by 0 days.

This patent is subject to a terminal disclaimer.

(21) Appl. No.: 14/194,315

(22) Filed: Feb. 28, 2014

(65) Prior Publication Data

US 2014/0179378 A1   Jun. 26, 2014

Related U.S. Application Data

(63) Continuation of application No. 13/363,205, filed on Jan. 31, 2012, now Pat. No. 8,700,101.

(30) Foreign Application Priority Data

Mar. 9, 2011   (JP) .................................. 2011-051512

(51) Int. Cl.
*H04M 1/00* (2006.01)
*H04W 68/00* (2009.01)
*H04M 1/02* (2006.01)
*H04M 1/725* (2006.01)
(Continued)

(52) U.S. Cl.
CPC ............ *H04W 68/00* (2013.01); *H04M 1/0245* (2013.01); *H04M 1/72519* (2013.01); *H04M 19/04* (2013.01); *H04W 88/02* (2013.01); *H04M 2250/12* (2013.01)

(58) Field of Classification Search
CPC   H04W 68/00; H04M 1/0245; H04M 1/72519
USPC ................. 455/566, 567, 550.1, 575.1, 575.2
See application file for complete search history.

(56) References Cited

U.S. PATENT DOCUMENTS

| | | | |
|---|---|---|---|
| 7,280,666 B2 | 10/2007 | Guyot et al. | |
| 8,666,453 B2 * | 3/2014 | Kao et al. | ...................... 455/566 |
| 2003/0013495 A1 | 1/2003 | Oleksy | |

(Continued)

FOREIGN PATENT DOCUMENTS

| | | |
|---|---|---|
| JP | 08-139788 A | 5/1996 |
| JP | 2000-152323 A | 5/2000 |

(Continued)

OTHER PUBLICATIONS

Office Action dated Aug. 22, 2013 from corresponding Korean Patent Application No. 10-2012-0009843, 4 pages.

(Continued)

*Primary Examiner* — Khai M Nguyen
(74) *Attorney, Agent, or Firm* — Duane Morris LLP; Richard C. Kim

(57) ABSTRACT

A system and methods for controlling a mobile electronic device is disclosed. A notification in response to a prescribed event is outputted. A change in a position of the mobile electronic device is detected. A strength of the notification is reduced, when a change in the position of the mobile electronic device is detected while the notification sound is being outputted.

9 Claims, 11 Drawing Sheets

(51) Int. Cl.
*H04M 19/04* (2006.01)
*H04W 88/02* (2009.01)

(56) References Cited

U.S. PATENT DOCUMENTS

| | | | |
|---|---|---|---|
| 2003/0199290 A1* | 10/2003 | Viertola | 455/575.1 |
| 2004/0204190 A1 | 10/2004 | Dietrich et al. | |
| 2008/0137883 A1 | 6/2008 | Araki | |
| 2009/0143877 A1 | 6/2009 | Panje | |
| 2009/0146608 A1 | 6/2009 | Lee | |
| 2010/0041431 A1 | 2/2010 | Kim et al. | |
| 2010/0048256 A1 | 2/2010 | Huppi et al. | |
| 2010/0227642 A1* | 9/2010 | Kim et al. | 455/556.1 |
| 2011/0053581 A1 | 3/2011 | Kao et al. | |
| 2011/0096006 A1* | 4/2011 | Jeong et al. | 345/173 |

FOREIGN PATENT DOCUMENTS

| | | |
|---|---|---|
| JP | 2008-092164 A | 4/2008 |
| JP | 2010-192979 A | 9/2010 |
| KR | 10-2006-0061618 A | 6/2006 |
| KR | 10-2007-0052477 A | 5/2007 |

OTHER PUBLICATIONS

Office Action dated Sep. 30, 2014, from corresponding Japanese Patent Application No. 2011-051512 (Concise Explanation of Relevance included), 5 total pages.

* cited by examiner (A) Front-facing state (B) Back-facing state

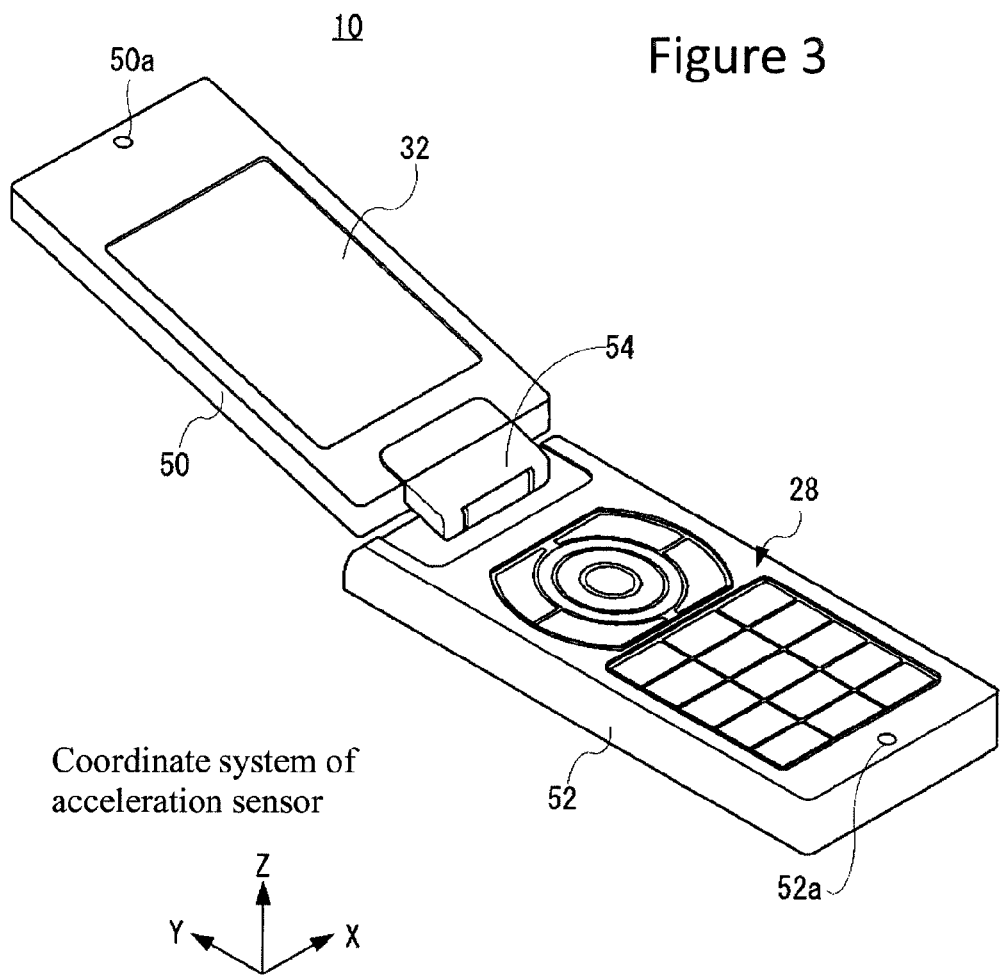

MOBILE ELECTRONIC DEVICE

CROSS-REFERENCE TO RELATED APPLICATION

The present application is a continuation of U.S. application Ser. No. 13/363,205, filed Jan. 31, 2013, and titled MOBILE ELECTRONIC DEVICE, which claims priority under 35 U.S.C. §119 to Japanese Patent Application No. 2011-051512, filed on Mar. 9, 2011, entitled "MOBILE TERMINAL, METHOD FOR CONTROLLING MOBILE TERMINAL, AND PROGRAM FOR CONTROLLING MOBILE TERMINAL", the content of which are incorporated by reference herein in their entirety.

FIELD

Embodiments of the present disclosure relate generally to mobile electronic devices, and more particularly relate to mobile electronic devices generating notifications indicators.

BACKGROUND

There are mobile electronic devices that raise a volume of a ring alert if a speaker surface is facing downward when a call is received, compared to when the speaker surface is not facing downward. However, this process may be undesirable for a user when sound may be an inconvenience for the user, such as in a meeting or in a public facility.

SUMMARY

A mobile electronic device and method is disclosed. A speaker outputs a notification sound in response to a prescribed event. A position detection module detects a change in a position of the mobile electronic device. A notification-sound control module performs one of terminating the notification and reducing a strength of the notification volume thereof, when the position detection module detects the change in the position of the mobile electronic device while the speaker is outputting the notification sound.

In one embodiment, a mobile electronic device comprises a speaker, a position detection module, and a notification-sound control module. The speaker outputs a notification sound in response to a prescribed event. The position detection module detects a change in a position of the mobile electronic device. The notification-sound control module performs one of terminating the notification sound and reducing a volume thereof, when the position detection module detects the change in the position of the mobile electronic device while the speaker is outputting the notification sound.

In another embodiment, a method for controlling a mobile electronic device outputs a notification sound in response to a prescribed event. The method further detects a change in a position of the mobile electronic device. The method further reduces the volume of the notification sound, when a change in the position of the mobile electronic device is detected while the notification sound is being outputted.

A computer readable storage medium comprises computer-executable instructions for performing a method for controlling a mobile electronic device. The method executed by the computer-executable instructions outputs a notification sound in response to a prescribed event. The method executed by the computer-executable instructions further detects a change in a position of the mobile electronic device. The method executed by the computer-executable instructions further performs one of terminating the notification sound and reducing the notification sound, when a change in the position of the mobile electronic device is detected while the notification sound is being outputted.

BRIEF DESCRIPTION OF THE DRAWINGS

Embodiments of the present disclosure are hereinafter described in conjunction with the following figures, wherein like numerals denote like elements. The figures are provided for illustration and depict exemplary embodiments of the present disclosure. The figures are provided to facilitate understanding of the present disclosure without limiting the breadth, scope, scale, or applicability of the present disclosure.

FIG. 3 is an illustration of a mobile electronic device in an open position according to an embodiment of the disclosure.

DETAILED DESCRIPTION

The following description is presented to enable a person of ordinary skill in the art to make and use the embodiments of the disclosure. The following detailed description is exemplary in nature and is not intended to limit the disclosure or the application and uses of the embodiments of the disclosure. Descriptions of specific devices, techniques, and applications are provided only as examples. Modifications to the examples described herein will be readily apparent to those of ordinary skill in the art, and the general principles defined herein may be applied to other examples and applications without departing from the spirit and scope of the disclosure. The present disclosure should be accorded scope consistent with the claims, and not limited to the examples described and shown herein.

Embodiments of the disclosure are described herein in the context of one practical non-limiting application, namely, a mobile electronic device such as a mobile phone. Embodiments of the disclosure, however, are not limited to such mobile phone, and the techniques described herein may be utilized in other applications. For example, embodiments may be applicable to digital books, digital cameras, electronic game machines, digital music players, personal digital assistance (PDA), personal handy phone system (PHS), lap top computers, TV's, Global Positioning Systems (GPSs) or navigation systems, pedometers, health equipment, display monitors, or other electronic device that uses a display screen or a touch panel for displaying information.

As would be apparent to one of ordinary skill in the art after reading this description, these are merely examples and the embodiments of the disclosure are not limited to operating in accordance with these examples. Other embodiments may be utilized and structural changes may be made without departing from the scope of the exemplary embodiments of the present disclosure.

Figure 1:
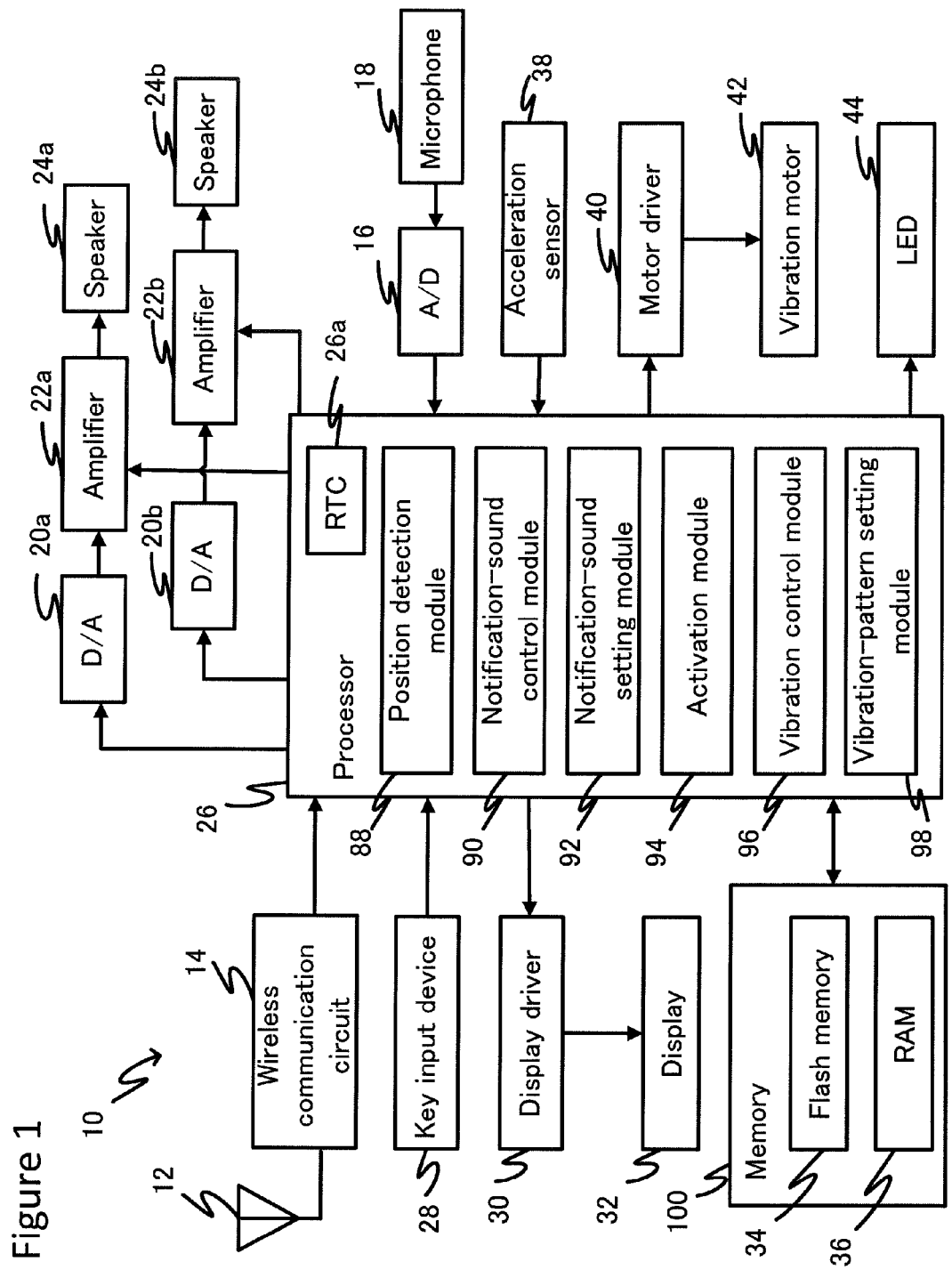
FIG. 1 is an illustration of a functional block diagram of a mobile electronic device according to an embodiment of the disclosure.

FIG. 1 is an illustration of a functional block diagram of a mobile electronic device such as a mobile phone 10 (system 10) according to an embodiment of the disclosure. A practical system 10 may comprise any number of, any number of processors, any number of memory modules, any number of display modules, or any number of other modules. The illustrated system 10 depicts a simple embodiment for ease of description. Those of skill in the art will understand that the various illustrative blocks, modules, circuits, and processing logic described in connection with the embodiments disclosed herein may be implemented in hardware, computer-readable software, firmware, or any practical combination thereof.

To illustrate clearly this interchangeability and compatibility of hardware, firmware, and software, various illustrative components, blocks, modules, circuits, and steps are described generally in terms of their functionality. Whether such functionality is implemented as hardware, firmware, or software depends upon the particular application and design constraints imposed on the overall system. Those familiar with the concepts described herein may implement such functionality in a suitable manner for each particular application, but such implementation decisions should not be interpreted as causing a departure from the scope of the present disclosure.

The mobile phone 10 may comprise a processor 26 that is referred to as a computer or a CPU. The system 10 may also comprise a wireless communication circuit 14, an A/D converter 16, a D/A converter 20a, a D/A converter 20b, an amplifier 22a, an amplifier 22b, a key input device 28, a display driver 30, a memory 100 comprising a flash memory 34 and a RAM 36, an acceleration sensor 38, a motor driver 40, and an LED 44, that are each communicatively coupled to the processor 26.

An antenna 12 is connected to the wireless communication circuit 14. A microphone 18 is connected to the A/D converter 16. A speaker 24a is connected to the D/A converter 20a via the amplifier 22a, and a speaker 24b is connected to the D/A converter 20b via the amplifier 22b. A display module 32 is connected to the display driver 30. A vibration motor 42 is connected to the motor driver 40.

The processor 26 is configured to control operations of the system 10. The processor 26 also controls the display module 32 to display input/output parameters, or other data. Further, the processor 26 accesses the memory 100. The processor 26, may be implemented or realized with a general purpose processor, a content addressable memory, a digital signal processor, an application specific integrated circuit, a field programmable gate array, any suitable programmable logic device, discrete gate or transistor logic, discrete hardware components, or any combination thereof, designed to perform the functions described herein.

In this manner, a processor may be realized as a microprocessor, a controller, a microcontroller, a state machine, or the like. A processor may also be implemented as a combination of computing devices, e.g., a combination of a digital signal processor and a microprocessor, a plurality of microprocessors, one or more microprocessors in conjunction with a digital signal processor core, or any other such configuration. In practice, the processor module 610 comprises processing logic that is configured to carry out the functions, techniques, and processing tasks associated with the operation of system 10. In particular, the processing logic is configured to support sound control operation of the system 10 described herein.

The processor 26 may comprise a position detection module 88, a notification-sound control module 90, a notification-sound setting module 92, an activation module 94, a vibration control module 96, a vibration-pattern setting module 98.

The position detection module 88 is operable to detect a change in a position of the mobile phone 10.

The notification-sound control module 90 is operable to perform one of terminating the notification sound and reducing a volume thereof, where the position detection module detects the change in the position of the mobile phone 10 while the speaker 24a/24b is outputting the notification sound.

The notification-sound setting module 92 is operable to set the volume of the notification sound, when the position detection module 88 detects the position of the mobile phone 10 when a prescribed event occurs, where the notification-sound control module 90 does not perform outputting the notification sound or reduces the volume of the notification sound set by the notification-sound setting module 92, when the position detected by the position detection module 88 is a prescribed position. The prescribed event may comprise for example but without limitation, a communication request, reception of an E-mail, matching clock time, or other event.

The activation module 94 operable to activate the vibration motor 42 in response to the prescribed event.

The vibration control module 96 is operable to perform one of deactivating the vibration motor 42 and reducing an intensity of the vibration, when the position detection module 88 detects a change in the position of the mobile phone 10.

The vibration-pattern setting module 98 is operable to set a pattern of vibration, where the position detection module 88 also detects the position of the mobile phone 10, when the prescribed event occurs, and the vibration control module 96 does not perform one of activating the vibration module and reducing an intensity of the vibrations adhering to the vibration pattern, when the position detected by the position detection module 88 is a prescribed position.

The memory 100 may be any suitable data storage area with suitable amount of memory that is formatted to support the operation of the system 10. The memory 100 is configured to store, maintain, and provide data as needed to support the functionality of the system 10 in the manner described below. In practical embodiments, the memory 100 may comprise, for example but without limitation, a non-volatile storage device (non-volatile semiconductor memory, hard disk device, optical disk device, and the like), a random access storage device (for example, SRAM, DRAM), or any other form of storage medium known in the art. The memory 100 may be coupled to the processor 26 and configured to store, for example but without limitation, position of the mobile electronic device, notification sound, current clock time, characters, images, audio, videos, or other data.

The memory 100 may comprise a RAM 36, and a flash memory 34. The RAM 36 may be used as a working space (including an imaging space) and buffer space for the processor 26. In the flash memory 34, data for content such as characters, images, audio, sounds and videos for the mobile phone 10 may be stored.

The A/D converter 16 converts analog audio signals of audio or sounds input through the microphone 18 connected to the A/D converter 16 into digital audio signals. The D/A converter 20a converts digital audio signals into analog audio signals and provides the signals to the speaker 24a via the amplifier 22a. The D/A converter 20b converts digital audio signals into analog audio signals and provides the signals to the speaker 24b via the amplifier 22b. Audio or sounds corresponding to the analog audio signals are output from the speaker 24a and the speaker 24b.

The key input device 28 comprises a Call key, an End Call key, a Function key, a cursor key, and an Enter key, etc. The key input device 28 also comprises keys corresponding to each of the numbers "0" through "9", as well as dial keys including a "*" key and a "#" key, etc. The key input device 28 outputs information on the key (hereinafter also referred to as "key data") operated by the user to the processor 26. When the various keys comprised in the key input device 28 are operated, a clicking sound may be output from the speaker 24b (or the speaker 24a). The user is able to confirm that the key operations are being received by listening to the clicking sounds. When the various keys comprised in the key input device 26 are operated, the mobile phone 10 may vibrate instead of outputting a feedback sound, or the mobile phone 10 may vibrate as a feedback sound is output. Based on the vibrations, the user is able to confirm that the key operations are being received.

In response to key operations performed on the cursor key, the processor 26 outputs signals that adjust the volume to the amplifiers 22a, 22b. The volume is adjusted by changing the amplification factors of the amplifiers 22a, 22b. By operating the cursor key, the user is able to adjust the volume of audio or sounds output from the speaker 24a and the speaker 24b. The volume of audio or sounds may be adjusted during the output of the audio or sounds. The volume of ring alerts for telephone calls, ring alerts for E-mails (i.e., notification sounds providing notification of new E-mails), and notification sounds such as alarms (i.e., alert sounds) may be set in advanced by the user. The types of notification sounds and alarm sounds used may also be set in advanced by the user.

The display driver 30 is configured to control the display on the display module 32 based on instructions from the processor 26. The display driver 30 may comprise a video memory that temporarily stores image data displayed on the display 32.

The acceleration sensor 38 comprises acceleration sensors in three axes. The acceleration sensor 38 is configured to output acceleration data corresponding to the respective accelerations in the directions of the three axes to the processor 26. Based on the accelerations indicated by the acceleration data from the acceleration sensor 38 as well as on changes in acceleration, the processor 26 is able to determine the orientation (position) and movement (changes in position) of the mobile phone 10.

The vibration motor 42 may comprise an eccentric motor. The vibration motor 42 is configured to operate based on drive signals from the motor driver 40. When the vibration motor 42 is operated, the mobile phone 10 vibrates. If there is a call received (incoming call) or notification of a new E-mail (incoming E-mail), or if the time for an alarm has arrived, the vibration motor 42 may vibrate using prescribed patterns (vibration patterns). The vibration patterns may be set by the user in advance. Multiple types of vibration patterns are prepared by changing the combinations of time intervals between periods in which a voltage is applied to the vibration motor 42 and periods in which no voltage is applied.

Under the control of the processor 26, the LED 44 is able to light up, turn off, or blink. If there is an incoming call or an incoming E-mail, or if the time for an alarm has arrived, the LED 44 is configured to blink using prescribed patterns (blinking patterns). The blinking patterns may be set in advance by the user. The LED 44 may simply light up instead of blinking. Multiple blinking patterns are prepared by changing the combinations of time intervals between periods in which a voltage is applied to the LED 44 and periods in which no voltage is applied.

Depending on the LED 44, the color used for lighting up may be changed. The colors used for lighting up may be set in advance by the user.

The wireless communication circuit 14 is configured to transmit and receive a plurality of communication signals comprising data signals via a base station. The wireless communication circuit 14 communicates with the wireless network via a wireless data communication link (not shown). The wireless communication circuit 14 cooperates with a base station transceiver (not shown) with a suitably configured RF antenna arrangement 12 that can support a particular wireless communication protocol and modulation scheme to transmit and receive the data signals form and to the processor 26. The data signals may comprise, for example but without limitation, voice data during voice communication, image signal, text data during email, web data during accessing web site, or other signal.

The wireless communication protocol and modulation scheme may comprise, for example but without limitation, the Third Generation Partnership Project Long Term Evolution (3GPP LTE)™, Third Generation Partnership Project 2 Ultra Mobile Broadband (3 Gpp2 UMB)™, Time Division-Synchronous Code Division Multiple Access (TD-SCDMA)™, and Wireless Interoperability for Microwave Access (WiMAX)™, or other wireless communication protocol and modulation scheme.

When the user issues an instruction for an outgoing call (call request) using the key input device 28, the wireless communication circuit 14 executes processes for the outgoing call and output outgoing-call signals via the antenna 12. The outgoing-call signals are transmitted to a telephone of the other party via a base station and a communication network. When processes for incoming calls are performed in the telephone of the other party, communication is established, and the processor 26 executes a communication process.

Figure 2A:
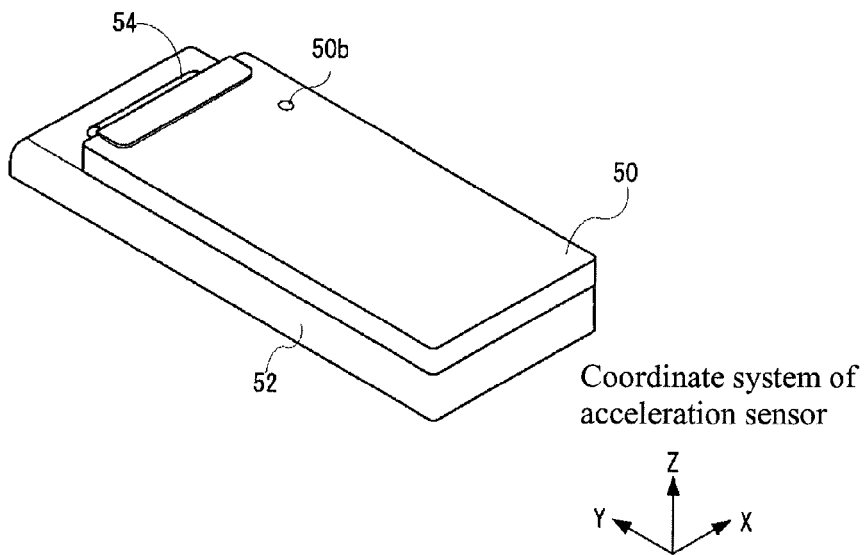
FIG. 2A is an illustration of a mobile electronic device in a closed/folded position according to an embodiment of the disclosure.
Figure 2B:
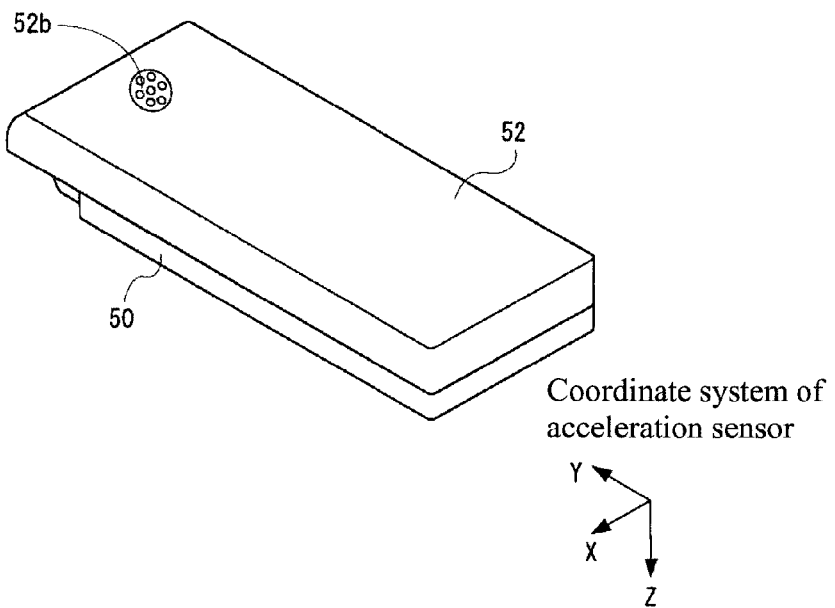
FIG. 2B is an illustration of a mobile electronic device in a closed/folded position according to an embodiment of the disclosure.

FIG. 2A and FIG. 2B are illustrations of a mobile electronic device in a closed/folded position according to an embodiment of the disclosure. FIG. 3 is an illustration of a mobile electronic device in an open position according to an embodiment of the disclosure. In FIGS. 2A and 2B, the mobile phone 10 has a first chassis 50 and a second chassis 52 that are both flat rectangular shapes. The first chassis 50 and the second chassis 52 are connected in a manner enabling them to turn through a hinge 54. The mobile phone 10 can be opened and closed. The folded state and the opened state may be referred to as the "closed state" and "open state", respectively.

The first chassis 50 comprises the display module 32. The second chassis 52 comprises the key input device 28. As shown in FIG. 3, the key input device 28 and the display 32 are exposed when the mobile phone 10 is in the open state. As shown in FIGS. 2A and 2B, the key input device 28 and the display 32 face each other when the mobile phone 10 is in the closed state.

The second chassis 52 may comprise the acceleration sensor 38. FIG. 2A shows a state in which the first chassis 50 is on top in the closed state. In FIG. 2A, the width direction (lateral direction) of the mobile phone 10 is the X-axis direction of the acceleration sensor 38, the length direction (longitudinal direction) of the mobile phone 10 is the Y-axis direction of the acceleration sensor 38, and the height direction (thickness direction) of the mobile phone 10 is the Z-axis direction of the acceleration sensor 38. In FIG. 2A, the rightward direction of the mobile phone 10 is the plus direction of the X-axis, and upward direction in the horizontal surface is the plus direction of the Y-axis direction, and the vertical direction upward from the horizontal surface is the plus direction of the Z-axis direction.

In this document, the front-facing state (hereinafter also referred to as the "first state") refers to the state in which, if the mobile phone 10 is in the closed state, the first chassis 50 is on top. Also, the back-facing state (hereinafter also referred to as the "second state") is the state in which, if the mobile phone 10 is in the closed state, the second chassis 52 is on top. If the mobile phone 10 is in the open state, the first state may comprise the state in which the key input device 28 and the display 32 are facing upward as shown in FIG. 3. If the mobile phone 10 is in the open state, the second state may comprise the state in which the key input device 28 and the display 32 are facing downward.

The processor 26 may determine whether the mobile phone 10 is in the first state or the second state by using the acceleration data input from the acceleration sensor 38. If the acceleration in the Z-axis direction matches or almost matches the gravitational acceleration g (9.8 m/s$^2$), the processor 26 may determine that the mobile phone 10 is in the second state. If the acceleration in the Z-axis direction matches or almost matches – (minus) g, the processor 26 may determine that the mobile phone 10 is in the first state.

The first chassis 50 comprises the speaker 24a. As shown in FIG. 3, an opening 50a that leads to the speaker 24a is provided above the display 32. The second chassis 52 comprises the microphone 18. As shown in FIG. 3, an opening 52a that leads to the microphone 18 is provided below the key input device 28. The first chassis 50 may also house the speaker 24a. The second chassis 52 may also house the microphone 18.

The first chassis 50 comprises the LED 44. As shown in FIG. 2A, an opening 52b that leads to the LED 44 is provided on the side that is the front surface (upper surface) of the first chassis 50 and that is connected to the second chassis 52. The second chassis 52 comprises the speaker 24b. As shown in FIG. 2B, an opening 52b that leads to the speaker 24b is provided on the side that is the rear surface of the second chassis 52 and that is connected to the first chassis 50. The first chassis 50 may also comprise the LED 44. The second chassis 52 may also comprise the speaker 24b.

A magnetic sensor is configured to detect the open state and closed state of the mobile phone 10. The magnetic sensor may comprise a magnet. The hinge 54 comprises in its interior a retention mechanism for retaining the open state and closed state. The antenna 12, the wireless communication circuit 14, the processor 26, the display driver 30, the flash memory 34, the RAM 36, the acceleration sensor 38, the motor driver 40, the vibration motor 42, and the LED 44 are housed in either the first chassis 50 or the second chassis 52.

A communication process is described in detail below. Modulated audio signals sent from the telephone of another party are received by the antenna 12. The received modulated audio signals undergo a demodulation process and decryption process implemented by the wireless communication circuit 14. The incoming audio signals obtained through the demodulation process and the decryption process are converted into analog audio signals by the D/A converter 20a. The analog audio signals are output from the speaker 24a via the amplifier 22a.

Outgoing audio signals introduced through the microphone 18 are converted into digital audio signals by the A/D converter 16. The digital audio signals are output to the processor 26. The outgoing signals converted into digital audio signals undergo an encoding process and a modulation process implemented by the wireless communication circuit 14. The outgoing signals that have undergone the encoding process and the modulation process are output via the antenna 12. The outgoing signals output from the antenna 12 are transmitted to the telephone of the other party via a base station and a communication network.

When outgoing-call signals from the telephone of another party are received by the antenna 12, the wireless communication circuit 14 notifies the processor 26 of the incoming call (call-in). In response, the processor 26 outputs a ring alert (which may be a ringer melody or a voice ring alert) from the speaker 24b at the volume set either by the user or as a default. At this time, the processor 26 may also cause the LED 44 to blink using a prescribed blinking pattern set either by the user or as a default. Incoming call may comprise incoming calls and incoming E-mails Moreover, the processor 26 may also cause the vibration motor 42 to operate using a prescribed vibration pattern set either by the user or as a default to cause the mobile phone 10 to vibrate. Depending on the settings, the output of a ring alert may be prevented, and/or operation of the vibration motor 42 may be prevented. Details of settings related to incoming-call alerts (incoming-call settings) comprise the type of ring alerts (type information), the length of the incoming-call alert (incoming-call alert time), the volume of notification sounds (volume information), and light-up patterns, etc. Vibration patterns may be comprised in the details of manner-mode settings that are separate from the incoming-call settings. Details of the incoming-call settings and the manner-mode settings are the same as those for incoming-call alerts for incoming E-mails, which will be described later.

When a call is received (as well as when an E-mail is received), the LED 44 may be referred to as an incoming-alert lamp.

As shown in FIG. 3, if the mobile phone 10 is in the open state, at approximately the same time as the output of the ring alert, the processor 26 controls the display driver 30 and displays source information (a telephone number, etc.) described in the incoming-call alert on the display module 32.

When the operator performs a response operation using the Call key, the wireless communication circuit 14 executes a call reception process under the instruction of the processor 26. Furthermore, a communicable state is established, and the processor 26 executes the abovementioned communication process. When the user performs a response operation, the output of the ring alert, the blinking of the incoming-alert lamp, and the vibration may be stopped. When the user uses the End Call key to perform an operation to reject the incoming call, the call is put on hold or the communication is disrupted, and the output of the ring alert, the blinking of the incoming-alert lamp, and the vibration are stopped.

When a call-end operation is performed using the End Call key after shifting into the communicable state, the processor 26 controls the wireless communication circuit 14 and transmits a call-end signal to the other party. After the transmission of the call-end signal, the processor 26 ends the communication process. Also, when a call-end signal is received from the other party first, the processor 26 may end the call process. Also, when a call-end signal is received from the mobile communication network regardless of the other party, the processor 26 may end the communication process.

The user is able to set (turn on or activate) a function or mode (also referred to as "manner mode") for not outputting a ring alert when a call is received. For example, when the user sets manner mode, no ring alert or clicking sound is output from the speaker 24b, but the vibration motor 42 is operated. When the user cancels (turns off or deactivates) manner mode, normal mode is activated, and ring alerts and clicking sounds are output from the speaker 24b but the vibration motor 42 is not operated. Even when manner mode is set, when a call is received, because the source information is displayed on the display module 32, etc. and the mobile phone 10 vibrates, the user is notified of the incoming call. Regardless of whether or not manner mode is set, the LED 44 may light up when a call is received.

Separately from the settings for manner mode, a function or mode (also referred to as "silent mode") for not outputting telephone ring alerts may be set (turned on or activated). For example, when the user sets silent mode, no ring alert or clicking sound is output from the speaker 24b. However, regardless of whether or not silent mode is set, when a call is received, because the LED 44 blinks and (if the mobile phone 10 is in the open state) the source information is displayed on the display module 32, the user is notified of the incoming call.

In normal mode or silent mode, when using the vibration function, the vibration motor 42 may be operated in response to incoming calls. The same applies for incoming E-mails and alarms. In the present embodiment, cases that are neither silent mode nor manner mode may be defined as normal mode.

Operations of the mobile phone 10 if manner mode or silent mode is set are the same when an E-mail is received or when an alarm is executed.

The mobile phone 10 may have an E-mail function. If there is an E-mail transmitted to the mobile phone 10 from another terminal, notification of the new E-mail (new-mail alert) is transmitted from the E-mail server to the mobile phone 10. In the mobile phone 10, when the processor 26 receives the new-mail alert via the antenna 12 and the wireless communication circuit 14, a notification sound for the incoming E-mail is output from the speaker 24b. The LED 44 may blink using a prescribed blinking pattern. If manner mode is set, no notification sound for the incoming E-mail is output, and the vibration motor 42 is operated using a prescribed vibration pattern. If silent mode is set, no notification sound for the incoming E-mail is output.

If there is an incoming E-mail, when the user operates the key input device 28 to issue an instruction to receive the E-mail, the mobile phone 10 is able to access the E-mail server and receive the new E-mail. If there is an incoming E-mail, the mobile phone 10 may automatically access the E-mail server without a user operation and receive the E-mail. Data of the received E-mail is stored in the flash memory 34 or the RAM 36. In response to a display operation performed by the user, the content of the received E-mail may be displayed.

The notification sound for the incoming E-mail, the blinking of the incoming-alert lamp, and the vibration are stopped once the time indicated by the incoming-call alert time in the incoming-call settings for incoming E-mails elapses, or when the user performs an operation (operation to end the incoming-call alert) using a key.

If the user is transmitting an E-mail, a screen for creating an E-mail (new E-mail or reply) may be displayed. The user is able to operate the key input device 28 to input (or edit) the destination, subject and main text, etc., and to attach files, etc. After creating the E-mail, the user is able to operate the key input device 28 to issue an instruction for the transmission of the E-mail. When the user issues an instruction for the transmission of the E-mail, the created E-mail is transmitted to the E-mail server.

The mobile phone 10 has an alarm function. The user is able to use the key input device 28 to set an alarm. The details of the settings of the alarm may comprise information on whether the alarm is to be executed (execution information), information on the clock time at which the alarm is to be executed (clock-time information), information on the date (or every day, or specific days of the week) on which to execute the alarm (date information), information on the type of alarm sound (type information), the time for outputting the alarm sound or vibrating (alarm time), information on the volume of the alarm sound (volume information), information or whether to use a snooze function (snooze settings information), information on the time interval for snooze (snooze interval), and the blinking pattern of the LED 44, etc. The execution information is switched between cases in which the alarm is to be executed (active) and cases in which the alarm is not to be executed (inactive). The alarm time can be variably set by the user. The snooze settings information is switched between cases in which snooze is executed (active) and cases in which snooze is not executed (inactive).

The snooze function comprises a function for repeatedly executing an alarm even after the alarm is stopped once. In the mobile phone 10, the time interval (snooze interval) before the alarm is executed again is set by the user.

In accordance with the details of the alarm settings, when the alarm timing of the alarm arrives (i.e., when the date and time indicated by the date information and the clock-time information arrive), the alarm sound indicated by the type information is output from the speaker 24b. The LED 44 blinks using a prescribed blinking pattern. However, if manner mode is set, no alarm sound is output and the vibration motor 42 vibrates using a prescribed vibration pattern. If silent mode is set, no alarm sound is output.

When an instruction is issued to stop the alarm through a user operation of the key input device 28, the output of the alarm sound is stopped and the LED 44 is turned off. However, if manner mode is set, the vibration is stopped and the LED 44 is turned off. If silent mode is set, the LED 44 is turned off.

If, as the date information, the alarm is set to be executed on only one day (once), when the alarm is stopped or when the snooze function is deactivated, the execution information is set to be deactivated. If, as the date information, specific days of the week, etc. are set, even when the alarm is stopped or the snooze function is deactivated, the execution information is not deactivated. In accordance with the details of the alarm settings, the following alarm is executed. If the snooze function is set, when the alarm is stopped, the alarm is executed again after the snooze interval has elapsed.

In the mobile phone 10, if neither manner mode nor silent mode is set, if there is an incoming call or an incoming E-mail, a ring alert is output from the speaker 24b. Moreover, if neither manner mode nor silent mode is set, when the alarm timing of an alarm arrives, the alarm sound is output from the speaker 24b. Even if manner mode is set, if the mobile phone 10 receives an incoming call or an incoming E-mail, or if the alarm timing of an alarm arrives, the vibration motor 42 is operated and the mobile phone 10 vibrates.

In locations or cases (situations) in which it is not appropriate for a ring alert or alarm sound to be output or for the mobile phone 10 to vibrate (such as, for example, in a meeting room, a public location or a public transportation facility, etc.), it may be desirable to stop the output of or reduce the volume of ring alerts and alarm sounds, and to stop vibrations of the mobile phone 10 or reduce the intensity of vibrations.

However, if stopping the output of or reducing the volume of ring alerts and alarm sounds, or if stopping vibrations of the mobile phone 10 or reducing the intensity of vibrations, it is necessary to reject incoming calls (disrupt communication), stop the output of ring alerts, stop alarms, or reduce the volume by operating prescribed keys. Consequently, it is bothersome to look for and operate the prescribed keys. Moreover, if the user wishes to leave the location where it is not appropriate for a ring alert or alarm sound to be output or for the mobile phone 10 to vibrate and then respond to an incoming call, if communication is disrupted to stop the output of the ring alert, etc., it is necessary to call the other party back, and this is bothersome.

Therefore, the mobile phone 10 of the present embodiment is configured to stop or reduce the intensity of outputs of ring alerts and alarm sounds as well as vibrations of the mobile phone 10 through intuitive operations. If there is an incoming call, the output of the ring alert is stopped or the volume is reduced while maintaining the incoming call. If the user leaves the location where it is not appropriate for the ring alert to sound, they are able to response to the incoming call and converse over the phone. Therefore, continuous use is easy.

The following are detailed descriptions of cases of incoming calls, cases of incoming E-mails, and cases of alarms.

Cases of Incoming Calls

When there is an incoming call, in accordance with each mode (normal mode, manner mode, and silent mode), the mobile phone 10 executes a process for incoming calls (incoming-call process). The type information, incoming-call alert time, volume information, and blinking pattern may be set in advance by the user or based on default settings. In the present embodiment, when there is an incoming call, the time indicated by the incoming-call alert time (prescribed time) is Ta and the volume indicated by the volume information (set volume) is Va1. For example, the prescribed time Ta can be set to be from 10 seconds to 30 seconds, and the set volume Va1 can be set at any of the levels L1 through L5. In the present embodiment, at the level L5, the volume V of ring alerts is at the maximum, and at the level L1, the volume V of ring alerts is at the minimum, and at the level L0, there is no volume (V=0). For example, if the set volume Va1 is set to the level L0, this is silent mode. In the present embodiment, the set volume in silent mode is expressed as Va0.

Moreover, in manner mode, as described above, the type of vibration pattern used in the manner-mode settings is set in advanced by the user or based on default settings. For example, the vibration pattern is determined by a first period during which a drive voltage is applied to the vibration motor 42 and a second period during which no drive voltage is applied to the vibration motor 42. In the present embodiment, even with different vibration patterns, the length of the first period during which a drive voltage is applied is fixed. Consequently, when the length of the second period (time interval T) during which no drive voltage is applied to the vibration motor 42 is short, the vibration is felt to be stronger, and conversely, when the time interval T is long, the vibration is felt to be weaker. In the present embodiment, the time interval T can be set from 0.5 second to 2 seconds, and the time interval (set time) set by the user or based on default settings is represented as T1. Furthermore, the manner-mode settings are the same for incoming calls, incoming E-mails, and alarms.

If a ring alert is being output, or if vibrations are being generated, when the user turns over the mobile phone 10, the volume of the ring alert or the intensity of the vibrations is reduced. For example, the volume V may be changed from the set volume Va1 to the minimum volume (weak volume) Va2, and the time interval T may be changed from the set time T1 to the maximum time interval (maximum time) T2. In the present embodiment, the weak volume Va2 is the volume of the level L1. Moreover, the maximum time T2 is the maximum time interval (about 2 seconds).

In the present embodiment, the act of "turning over the mobile phone 10" refers to either changing from the front-facing state shown in FIG. 2A to the back-facing state shown in FIG. 2B, or changing from the back-facing state shown in FIG. 2B to the front-facing state shown in FIG. 2A. In this case, the acceleration in the Z-axis direction of the acceleration sensor 38 is equal to or greater than the gravitational acceleration g, and the polarity (+, −) reverses between before and after the change.

Moreover, in the mobile phone 10, because the acceleration sensor 38 is provided in three axes, even if the mobile phone 10 is turned over about the longitudinal axis (Y-axis direction in the coordinate system of the acceleration sensor) of the mobile phone 10, the acceleration in the X-axis direction changes, as a result, it may be detected that the mobile phone 10 has been turned over.

Instead of the acceleration sensor 38, a three-axis gyro sensor may be provided. If a three-axis gyro sensor is used, no matter what direction the mobile phone 10 is turned over, the fact that the mobile phone 10 has been turned over is detected based on changes in angular velocity.

Consequently, even if the user forgets to set manner mode or silent mode, they are able to reduce the volume of ring alerts and the intensity of vibrations by turning over the mobile phone 10. As a result, the user is able to easily reduce the volume of ring alerts and the intensity of vibrations through intuitive operations even in locations and cases in which the output of ring alerts and the generation of vibrations are inappropriate. Moreover, because there is no need to disrupt communication (hang up the phone), a phone call can be started immediately after moving to a different location. In other words, the user is able to easily implement continuous use.

If silent mode is set, because the volume V is Va0, depending on the orientation of the mobile phone 10, the volume V and the time interval T do not have to be changed.

Moreover, in the present embodiment, at the start of an incoming-call process, if the mobile phone 10 is in the second state, the volume V of the ring alert may be set to the weak volume Va2 from the outset, and the time interval T for the drive voltage applied to the vibration motor 42 may be set to the maximum time T2 from the outset. Even without setting manner mode or silent mode, by placing the mobile phone 10 in a back-facing state on a table or by holding the mobile phone 10 in the back-facing state, the user is able to reduce the volume of ring alerts and the intensity of vibrations. By placing the mobile phone 10 on a table or holding it in a back-facing state, the user is able to easily implement settings nearly equivalent to manner mode or silent mode.

In each of the modes of normal mode, manner mode, and silent mode, the LED 44 may blink and an incoming-call alert using the incoming-alert lamp may be executed. However, the blinking pattern of the LED 44 may be set by the user.

Cases of Incoming E-Mails

In each of the modes of normal mode, manner mode, and silent mode, as with cases of incoming calls, new-mail alerts (i.e., notifications of incoming E-mails) are implemented. Consequently, descriptions will be omitted for overlapping details.

In the present embodiment, in cases of incoming E-mails, the time (prescribed time) indicated by the incoming-call alert time is represented as Tb, and the volume (set volume) indicated by the volume information is represented as Vb1. For example, the prescribed time Tb can be set from 5 seconds to 30 seconds, and like the volume Va1, the set volume Vb1 can be set at any of the levels L1 through L5. Moreover, the level L0 indicates no volume (V=0). When the set volume Vb1 is set to the level L0, this is silent mode. The set volume in silent mode is represented as Vb0. Furthermore, in the case of incoming E-mails, the weak volume of the level L1 is represented as Vb2.

In the case of an incoming E-mail, in response to a new-mail alert, if the user turns over the mobile phone 10, the output of the ring alert or the vibration is stopped. This is because unlike cases of incoming calls, there is no real-time interaction such as a call. Therefore, the fact that the user has turned over the mobile phone 10 in response to the new-mail alert can be interpreted as meaning that the user is aware that there is a new E-mail, and that there is no further need to output the ring alert or vibrate the mobile phone 10.

Consequently, as in the cases of incoming calls, even if a ring alert or vibrations are generated in inappropriate locations or cases, the user is able to stop the output of the ring alert or the vibrations by turning over the mobile phone 10. The user is able to easily stop the output of ring alerts or vibrations through an intuitive operation.

Cases of Alarms

In each of the modes of normal mode, manner mode, and silent mode, as with incoming calls and incoming E-mails, alarms are executed when the alarm timing of an alarm arrives.

However, in the present embodiment, in cases of alarms, the time (prescribed time) indicated by the alarm time is represented as Tc, and the volume (set volume) indicated by the volume information is represented as Vc1. For example, the prescribed time Tc can be set from 30 seconds to 5 minutes, and as with the volume Va1, the set volume Vc1 can be set at any of levels L1 through L5. Moreover, the level L0 indicates no volume (V=0). In other words, when the set volume Vc1 is set to the level L0, this is silent mode. The set volume in silent mode is represented as Vc0. Furthermore, when an alarm is executed, the LED 44 may be referred to as an alarm lamp.

In the case of an alarm, when the mobile phone 10 is turned over when an alarm sound or vibrations are being generated, the alarm sound or vibrations are stopped. Moreover, the LED 44 is turned off.

Consequently, as with cases of incoming calls and incoming E-mails, even if an alarm sound or vibrations are generated in inappropriate locations or cases, the user is able to stop the output of the alarm sound or the vibrations simply by turning over the mobile phone 10. The user is able to easily stop the output of the alarm sound or the vibrations through an intuitive operation.

If the snooze function is active, the alarm is repeatedly executed until the snooze function is deactivated. In the present embodiment, when an alarm sound or vibrations are generated, even if the mobile phone 10 is in the back-facing state, the volume of the alarm sound or the intensity of the vibrations does not have to be reduced. This is because in such a case, if the volume of the alarm sound or the intensity of the vibrations is reduced, there is a chance that the alarm may not be able to fulfill its function.

Figure 4:
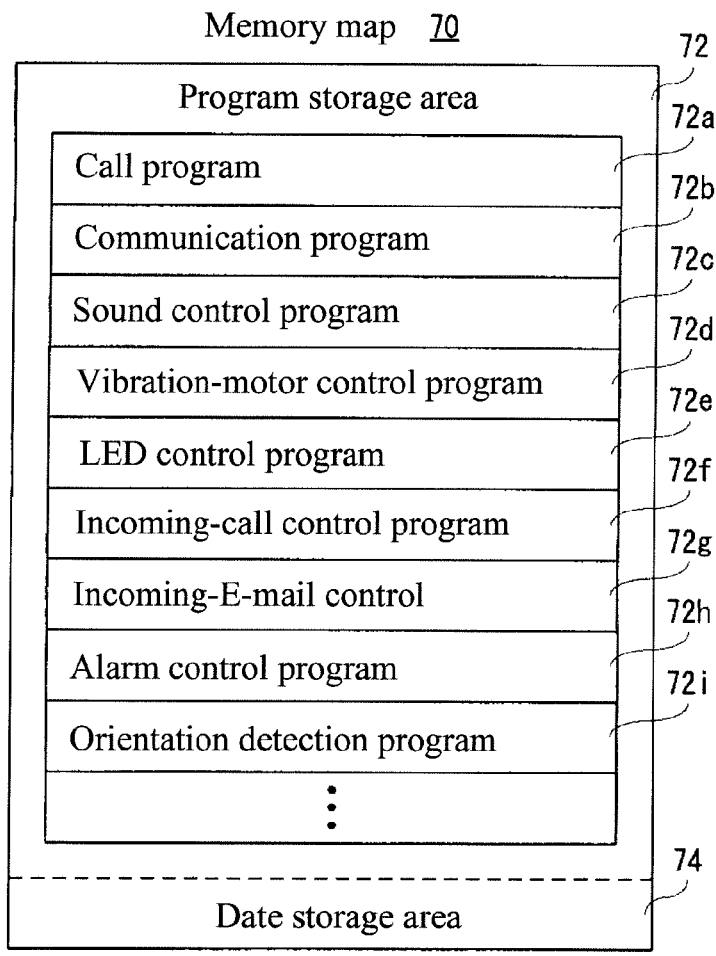
FIG. 4 is an illustration of an exemplary memory map of the mobile electronic device of FIG. 1.

FIG. 4 is an illustration of an exemplary memory map 70 of the mobile electronic device of FIG. 1. As shown in FIG. 4, the RAM 36 comprises a program storage area 72 and a data storage area 74. The program storage area 72 stores control programs of the mobile phone 10. The control programs comprise a call program 72a, a communication program 72b, a sound control program 72c, a vibration-motor control program 72d, an LED control program 72e, an incoming-call control program 72f, an incoming-E-mail control program 72g, an alarm control program 72h, and an orientation detection program 72i, etc.

The call program 72a is a program for executing call processes. The communication program 72b is a program for executing transmission/reception processes for E-mails and communication processes with other mobile phones and computers. The sound control program 72c is a program for outputting and stopping ring alerts and alarm sounds and changing the volume. The vibration-motor control program 72d is a program for operating and stopping the vibration motor 42 and changing the intensity of vibrations (vibration patterns). The LED control program 72e is a program for causing the LED 44 to light up, blink, and turn off.

The incoming-call control program 72f is a program for controlling the output and stopping of ring alerts as well as the generation and stopping of vibrations, controlling the blinking (lighting up) and turning off of the incoming-alert lamp, and controlling responses and rejections in accordance with user operations during incoming calls. The incoming-E-mail control program 72g is a program for controlling the output and stopping of ring alerts as well as the generation and stopping of vibrations, and controlling the blinking (lighting up) and turning off of the incoming-alert lamp during incoming E-mails. The alarm control program 72h is a program for controlling the output and stopping of alarm sounds as well as the generation and stopping of vibrations, and controlling the blinking (lighting up) and turning off of the alarm lamp at set clock times of alarms. The orientation detection program 72i is a program for detecting the orientation (position) of the mobile phone 10 and changes therein. In the present embodiment, mainly the front-facing state or the back-facing state is detected, as well as changes from the front-facing state to the back-facing state as well as changes from the back-facing state to the front-facing state.

The program storage area 72 also comprises a screen generation program and a screen display program, etc.

Figure 5:
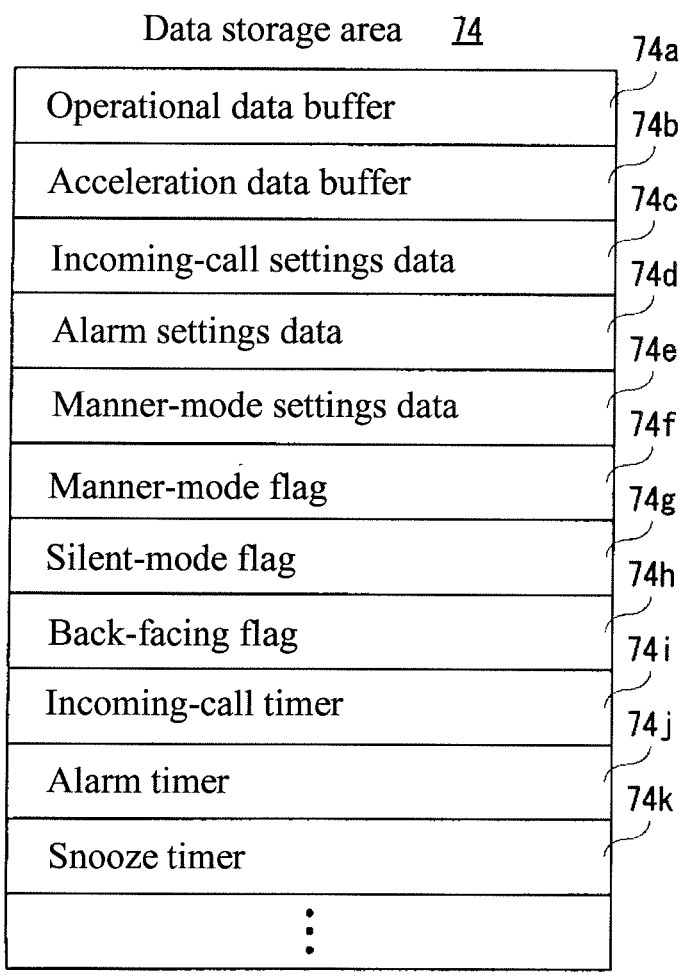
FIG. 5 is an illustration of an exemplary data storage area of the mobile electronic device of FIG. 1.

FIG. 5 is an illustration of an exemplary data storage area 74 of the mobile electronic device of FIG. 1. The data storage area 74 comprises an operational data buffer 74a and an acceleration data buffer 74b. The data storage area 74 comprises incoming-call settings data 74c, alarm settings data 74d, and manner-mode settings data 74e. Furthermore, the data storage area 74 comprises a manner-mode flag 74f, a silent-mode flag 74g, and a back-facing flag 74h. The data storage area 74 comprises an incoming-call timer 74i, an alarm timer 74j, and a snooze timer 74k.

The operational data buffer 74a is able to store (temporarily store) key data from the key input device 28. The key data stored in the operational data buffer 74a may be deleted (erased) after being used for processes of the processor 26. The acceleration data buffer 74b is able to temporarily store acceleration data from the acceleration sensor 38. The acceleration data stored in the acceleration data buffer 74b may be deleted after being used for processes of the processor 26.

The incoming-call settings data 74c are data regarding the details of the respective incoming-call settings for incoming calls and incoming E-mails set either by the user or by default. The details of the incoming-call settings for incoming calls comprise type information, incoming-call alert time (prescribed time Ta), volume information (set volume Va1), and blinking patterns, etc. Similarly, the details of the incoming-call settings for incoming E-mails comprise type information, incoming-call alert time (prescribed time Tb), volume information (set volume Vb1), and blinking patterns, etc.

The alarm settings data 74d are data regarding the details of alarm settings set by the user. The details of alarm settings comprise execution information, clock-time information, date information, type information, alarm time (set time Tc), volume information (set volume Vc1), snooze settings information, snooze interval, and blinking patterns, etc.

In the present embodiment, only one alarm is set, but two or more alarms may be set. If two or more alarms are set, alarm settings data may be created and stored for each alarm.

The manner-mode settings data 74e are data regarding vibration patterns (time interval T1) of the vibration motor 42 set either by the user or by default. If manner mode is not set, data indicating no vibration pattern (null) may be stored.

The manner-mode flag 74f is a flag indicating whether or not manner mode is set. The manner-mode flag 74f may be configured by a 1-bit register. If the manner-mode flag 74f is configured by a 1-bit register, when manner mode is set, the manner-mode flag 74f is turned on (established) and the data value "1" is set in the register. If the manner-mode flag 74f is configured by a 1-bit register, when manner mode is not set (is released), the manner-mode flag 74f is turned off (not established) and the data value "0" is set in the register.

The silent-mode flag 74g is a flag indicating whether or not silent mode is set. The silent-mode flag 74g may be configured by a 1-bit register. If the silent-mode flag 74g is configured by a 1-bit register, when silent mode is set, the silent-mode flag 74g is turned on and the data value "1" is set in the register. If the silent-mode flag 74g is configured by a 1-bit register, when silent mode is not set (is released), the silent-mode flag 74g is turned off and the data value "0" is set in the register.

Because both manner mode and silent mode cannot be set at the same time, if either one of the manner-mode flag 74f or the silent-mode flag 74g is turned on, the other is turned off.

In the present embodiment, the mobile phone 10 is described as having one each of both the manner-mode flag 74f and the silent-mode flag 74g, but this is not necessarily always the case. For example, manner mode, silent mode, and normal mode may be set individually for incoming calls, incoming E-mails, and alarms. In this case, the mobile phone 10 may comprise a manner-mode flag 74f and a silent-mode flag 74g corresponding to each mode.

The back-facing flag 74h is a flag indicating whether or not the mobile phone 10 is in the back-facing state. The back-facing flag 74h may be configured by a 1-bit register. If the back-facing flag 74h is configured by a 1-bit register, when the mobile phone 10 is in the back-facing state, the back-facing flag 74h is turned on and the data value "1" is set in the register. If the back-facing flag 74h is configured by a 1-bit register, when the mobile phone 10 is in the front-facing state, the back-facing flag 74h is turned off and the data value "0" is set in the register.

The incoming-call timer 74i is a timer for counting the time (incoming-call alert time) for outputting a ring alert or causing vibrations for incoming calls and incoming E-mails. The incoming-call alert time (i.e., the prescribed times Ta, Tb) may be set either by the user or by default. In the present embodiment, incoming calls and incoming E-mails are described at not occurring at the same time. Because incoming calls and incoming E-mails do not occur at the same time, the incoming-call timer 74i may be used for both cases of incoming calls and cases of incoming E-mails.

In the present embodiment, incoming calls and incoming E-mails are described as not occurring at the same time, but this is not necessarily always the case. Incoming calls and incoming E-mails may occur at the same time. The mobile phone 10 may have individual instances of the incoming-call timer 74i for cases of incoming calls and cases of incoming E-mails. If it is detected that the mobile phone 10 has been turned over when an incoming call and an incoming E-mail occur at the same time, the processor 26 may execute both the processes executed for incoming calls and the processes executed for incoming E-mails at the same time.

Moreover, if an E-mail is received during a call, when it is detected that the mobile phone 10 has been turned over, the processor 26 may execute the processes executed for incoming E-mails while maintaining the volume being used for the call.

E-mails received during a call may be detected by including an additional set of the antenna 12 and the wireless communication circuit 14. Moreover, incoming calls and incoming E-mails may be detected at the same time by including an additional set of the antenna 12 and the wireless communication circuit 14.

The alarm timer 74j is a timer for counting the prescribed time Tc (alarm time) for outputting an alarm sound or causing vibrations. As described above, the prescribed time Tc is set by the user. The snooze timer 74k is a timer for counting the snooze interval. The snooze interval may be set by the user.

The data storage area 74 may store image data, sound data, and other data required for executing the control programs of the mobile phone 10, and may also store other flags and timers (counters).

Next, processes of the processor 26 are described. The call reception process, the E-mail-reception process, and the alarm process may be executed in parallel through separate tasks.

Figure 6:
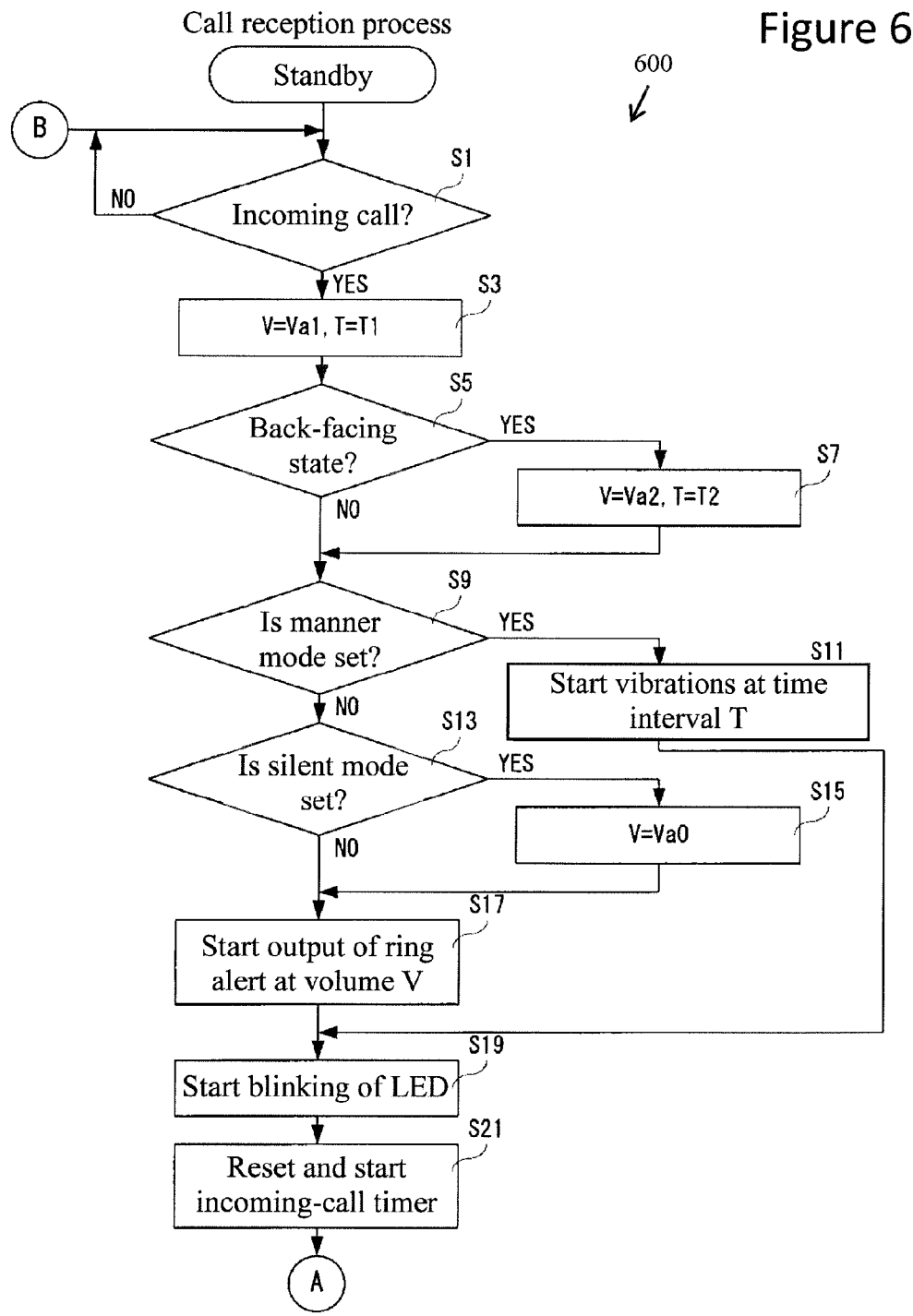
FIGS. 6-7 are illustrations of exemplary flowcharts showing a portion of a call reception process according to an embodiment of the disclosure.
Figure 7:
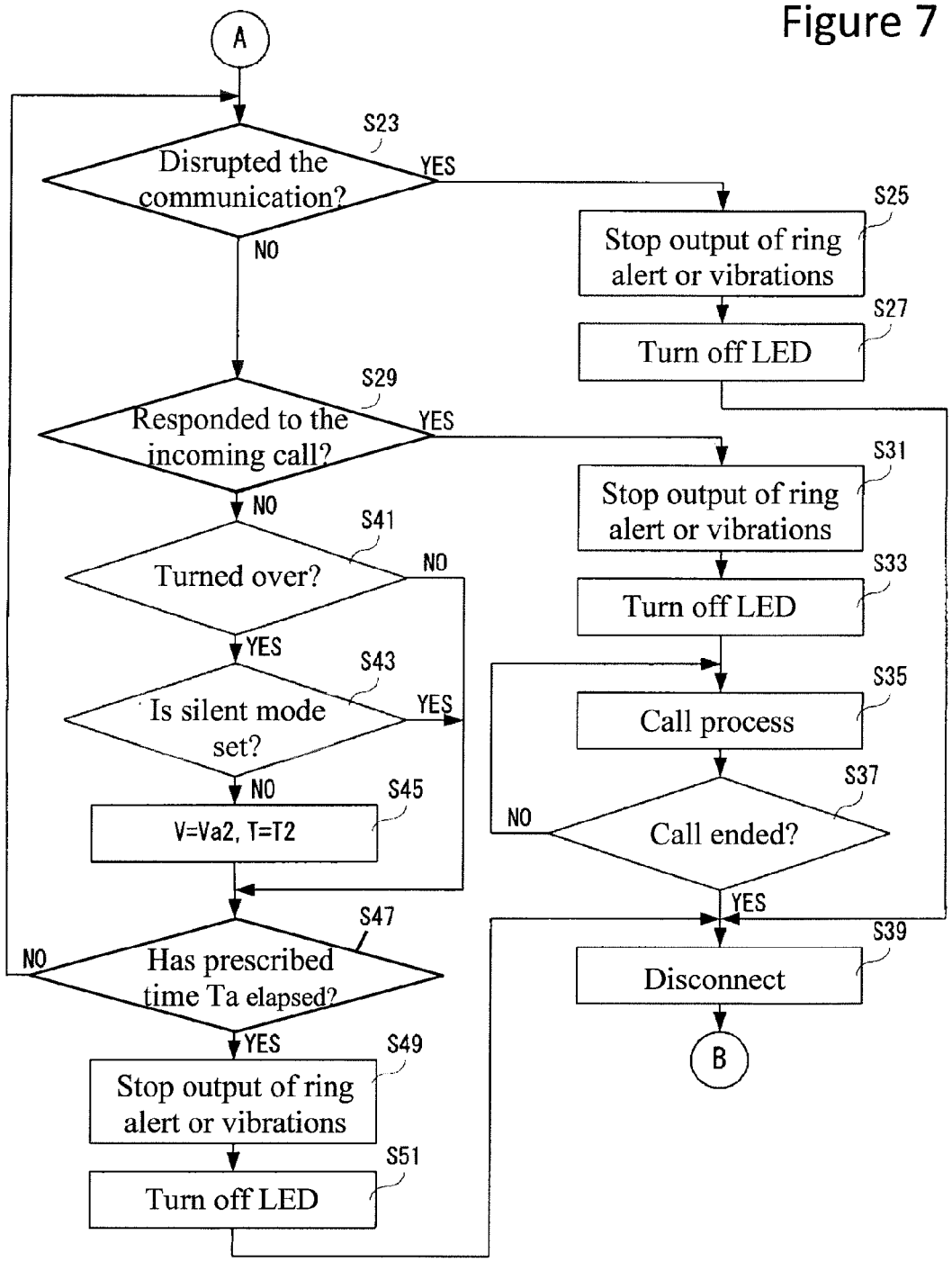

FIGS. 6-7 are illustrations of exemplary flowcharts showing a portion of a call reception process 600 according to an embodiment of the disclosure. The various tasks performed in connection with process 600 may be performed, by software, hardware, firmware, a computer-readable medium having computer executable instructions for performing the process method, or any combination thereof. The process 600 may be recorded in a computer-readable medium such as a semiconductor memory, a magnetic disk, an optical disk, and the like, and can be accessed and executed, for example, by a computer CPU such as the processor 26 in which the computer-readable medium is stored.

It should be appreciated that process 600 may include any number of additional or alternative tasks, the tasks shown in FIG. 6 need not be performed in the illustrated order, and process 600 may be incorporated into a more comprehensive procedure or process having additional functionality not described in detail herein. For illustrative purposes, the following description of process 600 may refer to elements mentioned above in connection with FIGS. 1-5.

In practical embodiments, portions of the process 600 may be performed by different elements of the system 10 such as: the processor 26, the wireless communication circuit 14, the A/D converter 16, the D/A converter 20a, the D/A converter 20b, the amplifier 22a, the amplifier 22b, the key input device 28, the display driver 30, the flash memory 34, the memory 100, the acceleration sensor 38, the motor driver 40, the LED 44, the speaker 24a, the speaker 24b, etc. Process 600 may have functions, material, and structures that are similar to the embodiments shown in FIGS. 1-5. Therefore common features, functions, and elements may not be redundantly described here.

When the call reception process is started in the standby state, in task S1, the processor 26 determines whether or not there is an incoming call. In other words, the processor 26 determines whether or not an outgoing audio signal from a communication partner has been received via the antenna 12 and the wireless communication circuit 14. If the result of task S1 is "NO" (i.e., if there is no incoming call), the processor 26 returns directly to the same task S1 and stands by until there is an incoming call. In other words, the standby state is continued. On the other hand, if the result of task S1 is "YES" (i.e., if there is an incoming call), in task S3, the processor 26 initializes the volume V and the time interval T (V=Va1, T=T1). In other words, the volume V is set to the set volume Va1, and the time interval T is set to the set time T1.

In the following task S5, the processor 26 uses the back-facing flag 74h to determine whether or not the mobile phone 10 is in the back-facing state. The processor 26 determines whether or not the back-facing flag 74h is on. Acceleration data from the acceleration sensor 38 are detected for each frame and stored in the acceleration data buffer 74b. Then, based on the acceleration data stored in the acceleration data buffer 74b, the back-facing flag 74h is set to be on or off. It should be noted that a frame may be the unit time during which the processor 26 executes the process, or an integral multiple of the unit time. If one frame is equivalent to the unit time, one frame is equivalent to 1/60 second, for example. In the present embodiment, one frame is set to be equivalent to the unit time.

If the result of task S5 is "YES" (i.e., if the back-facing flag 74h is on), the processor 26 determines that the mobile phone 10 is in the back-facing state. If the result of task S5 is "YES", in task S7, the processor 26 sets the volume V to the weak volume Va2 and also sets the time interval T to the maximum time T2 (V=Va2, T=T2). On the other hand, if the result of task S5 is "NO" (i.e., if the back-facing flag 74h is off), the processor 26 determines that the mobile phone 10 is not in the back-facing state and proceeds directly to task S9.

In task S9, the processor 26 determines whether or not manner mode has been set. In task S9, the processor 26 determines whether or not the manner-mode flag 74f is on. However, manner mode is set and released according to instructions from the user, but the manner-mode flag 74f may be set or released through a separate process. The same applies below in the present embodiment. Similarly, the silent-mode flag 74g (described later) is also set and released according to instructions from the user but may be turned on or off through a separate process, and descriptions that overlap with those of the manner-mode flag 74f will be omitted.

If the result of task S9 is "YES" (i.e., if the manner-mode flag 74f is on), the processor 26 determines that manner mode has been set. If the result of task S9 is "YES", in task S11, the processor 26 starts vibrations using the time interval T and proceeds to task S19. In other words, in task S11, under the instruction of the processor 26, a drive voltage is applied from the motor driver 40 to the vibration motor 42 to cause vibrations at the time interval T set to either the set time T1 or the maximum time T2.

On the other hand, if the result of task S9 is "NO" (i.e., if the manner-mode flag 74f is off), the processor 26 determines that manner mode has not been set. If the result of task S9 is "NO", in task S13, the processor 26 determines whether or not silent mode has been set. In other words, the processor 26 determines whether or not the silent-mode flag 74g is on.

If the result of task S13 is "YES" (i.e., if the silent-mode flag 74g is on), the processor 26 determines that silent mode has been set. If the result of task S13 is "YES", in task S15, the processor 26 sets the volume V to the set volume V0 (V=V0) and proceeds to task S17. The set volume V0 indicates no volume (V0=0).

On the other hand, if the result of task S13 is "NO" (i.e., if the silent mode flag 74g is off), the processor 26 determines that silent mode has not been set. If the result of task S13 is "NO", in task S17, the processor 26 starts the output of a ring alert at the volume V and proceeds to task S19. In task S17, the processor 26 controls the amplifier 22b to sound a ring alert at the volume V set to either the set volume Va1 or the weak volume Va2, and outputs sound data corresponding to the ring alert indicated by the type information to the D/A converter 20b. The type information is obtained from the incoming-call settings regarding incoming calls that are comprised in the incoming-call settings data 74c.

In task S19, the processor 26 causes the LED 44 to start blinking. For example, the processor 26 feeds and stops a voltage to the LED 44 at the prescribed time interval Td. However, the time interval Td is determined based on the light-up pattern. Then, in task S21, the processor 26 resets and starts the incoming-call timer 74i. Counting of the incoming-call alert time is started.

FIG. 7 is a flowchart continuing from FIG. 6 that shows the call reception process. In task S23, the processor 26 determines whether or not the user has disrupted communication with regard to the incoming call (i.e., rejected the incoming call). In other words, the processor 26 determines whether or not the End Call key has been operated by the user. Specifically, the processor 26 determines whether the key data of the current frame stored in the operational data buffer 74a are the key data of the End Call key. If the result of task S23 is "YES" (i.e., if the End Call key has been operated), the processor 26 determines that communication will be disrupted with regard to the incoming call. If the result of task S23 is "YES", in task S25, the processor 26 stops the output of the ring alert or the vibrations. Next, in task S27, the processor 26 turns off the LED 44 and proceeds to task S39.

On the other hand, if the result of task S23 is "NO" (i.e., if the user has not operated the End Call key), the processor 26 determines that communication has not been disrupted with regard to the incoming call (i.e., the incoming call has not been rejected). If the result of task S23 is "NO", in task S29, the processor 26 determines whether or not a response to the incoming call has been executed by the user. In other words, the processor 26 determines whether or not the user has operated the Call key. Specifically, the processor 26 determines whether the key data of the current frame stored in the operational data buffer 74a are the key data of the Call key.

If the result of task S29 is "YES" (i.e., if the Call key has been operated), in task S31, the processor 26 stops the output of the ring alert or the vibration. Next, in task S33, the processor 26 turns off the LED 44. Next, in task S35, the processor 26 executes the call process. Then, in task S37, the processor 26 determines whether or not the call has been ended (end of call). In other words, the processor 26 determines whether or not the End Call key has been operated by the user or whether a call-end signal has been received from the other party or the mobile communication network.

If the result of task S37 is "NO" (i.e., if the call has not been ended), the processor 26 returns to task S35 and continues the call process. On the other hand, if the result of task S37 is "YES" (i.e., if the call has been ended), in task S39, the processor 26 disrupts the communication and returns to task S1 as shown in FIG. 6.

Moreover, if the result of task S29 is "NO" (i.e., if the Call key has not been operated by the user), in task S41, the processor 26 determines whether the mobile phone 10 has been turned over. Here, the processor 26 determines whether the acceleration in the Z-axis direction corresponding to the acceleration data stored in the acceleration data buffer 74b has changed from g to −g, or from −g to g. However, the acceleration in the Z-axis direction does not have to completely match g or −g, and may match a value similar thereto. The same applies in the following.

If the result of task S41 is "NO" (i.e., if the mobile phone 10 has not been turned over), the processor 26 proceeds to task S47. On the other hand, if the result of task S41 is "YES" (i.e., if the mobile phone 10 has been turned over), in task S43, the processor 26 determines whether or not silent mode has been set. If the result of task S43 is "YES" (i.e., if silent mode has been set), the processor proceeds directly to task S47. On the other hand, if the result of task S43 is "NO" (i.e., if silent mode has not been set), in task S45, the processor 26 sets the volume V to the weak volume V2, sets the time interval T to the maximum time T2, and proceeds to task S47. In other words, depending on the process of task S45, the volume V is reduced or the intensity of vibrations is reduced.

In task S47, the processor 26 determines whether or not the prescribed time Ta (incoming-call alert time) has elapsed. Here, the processor 26 determines whether or not the count value of the incoming-call timer 74i has reached the prescribed time Ta (e.g., any number of seconds from 10 to 30 seconds). If the result of task S47 is "NO" (i.e., if the prescribed time Ta has not elapsed), the processor 26 returns to task S23. On the other hand, if the result of task S47 is "YES" (i.e., if the prescribed time Ta has elapsed), in task S49, the processor 26 stops the output of the ring alert or the vibration. Next, the processor 26 turns off the LED 44 in task S51 and proceeds to task (S39).

Furthermore, if the result of task S47 is "YES", the processor 26 may switch to a voicemail message service or switch to a message-recording mode to store a message from the caller. If the processor 26 switches to a voicemail message service, the terminal of the caller may be connected to a carrier server. Moreover, in the message-recording mode, after a message indicating that the user is unable to answer the phone has been transmitted, data corresponding to a message from the caller (message data) is stored once in the RAM 36, and then saved in the flash memory 34 after being stored once in the RAM 36.

Moreover, in the present embodiment, if the End Call key is operated by the user in response to an incoming call, the communication is disrupted, but the present invention is not limited to this. For example, the processor 26 may put the call on hold. When the Call key is operated by the user while a call is on hold, the processor 26 executes the call process. Moreover, if, for example, the End Call key is operated by the user while a call is on hold, the processor 26 may disrupt the communication.

Figure 8:
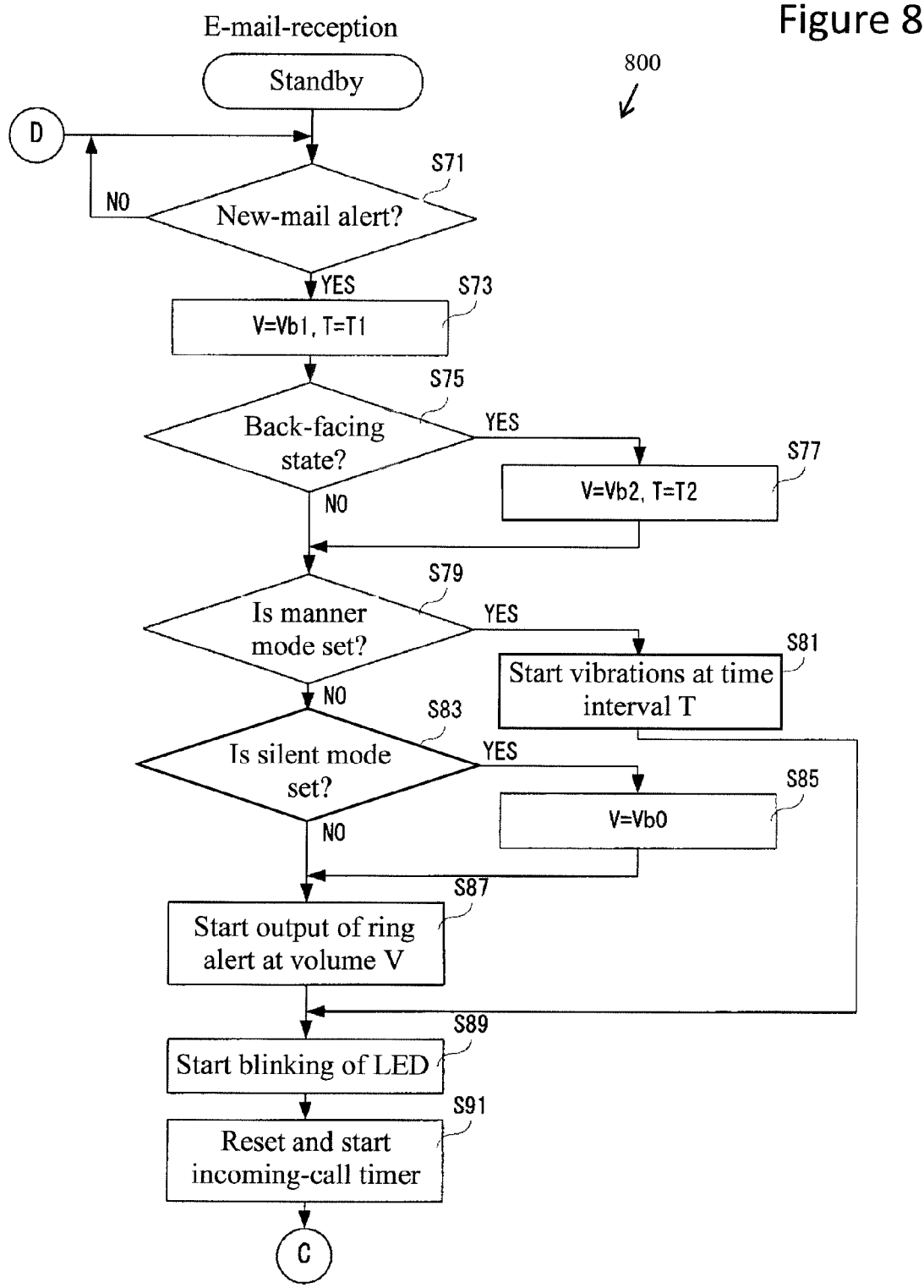
FIGS. 8-9 are illustrations of exemplary flowcharts showing a portion of an E-mail-reception process according to an embodiment of the disclosure.
Figure 9:
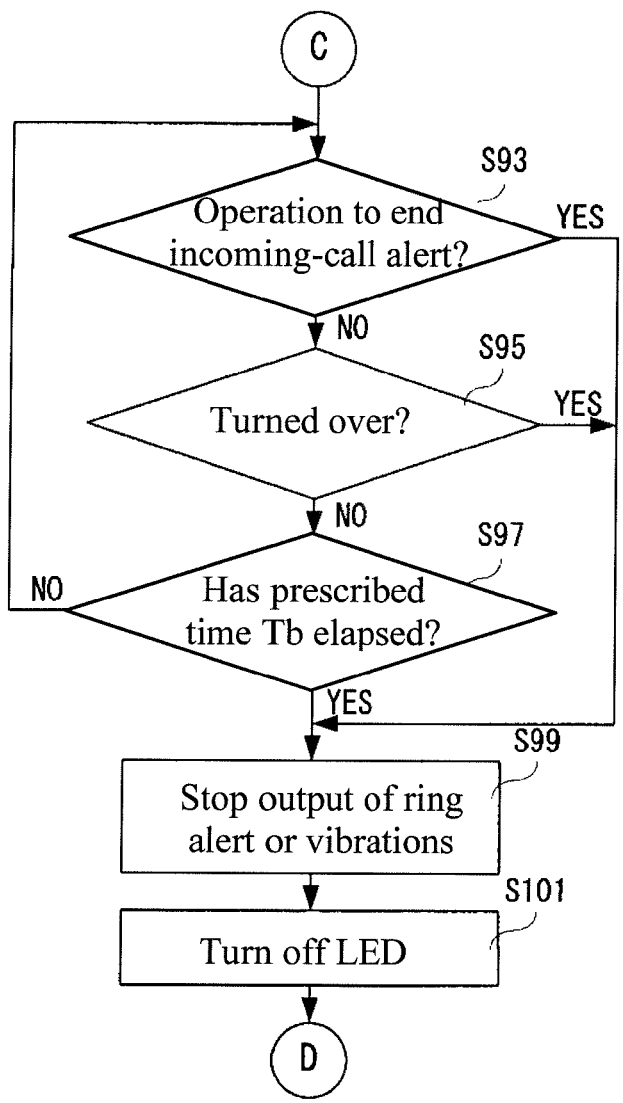

FIGS. 8 and 9 are illustration of a flowchart showing a portion of an E-mail-reception process 800 that can be performed by the processor 26 according to an embodiment of the disclosure. The various tasks performed in connection with process 800 may be performed, by software, hardware, firmware, a computer-readable medium having computer executable instructions for performing the process method, or any combination thereof. The process 800 may be recorded in a computer-readable medium such as a semiconductor memory, a magnetic disk, an optical disk, and the like, and can be accessed and executed, for example, by a computer CPU such as the processor 26 in which the computer-readable medium is stored.

It should be appreciated that process 800 may include any number of additional or alternative tasks, the tasks shown in FIGS. 8 and 9 need not be performed in the illustrated order, and process 800 may be incorporated into a more comprehensive procedure or process having additional functionality not described in detail herein. For illustrative purposes, the following description of process 800 may refer to elements mentioned above in connection with FIGS. 1-5.

In practical embodiments, portions of the process 800 may be performed by different elements of the system 10 such as: the processor 26, the wireless communication circuit 14, the A/D converter 16, the D/A converter 20a, the D/A converter 20b, the amplifier 22a, the amplifier 22b, the key input device 28, the display driver 30, the flash memory 34, the memory 100, the acceleration sensor 38, the motor driver 40, the LED 44, the speaker 24a, the speaker 24b, etc. Process 800 may have functions, material, and structures that are similar to the embodiments shown in FIGS. 1-5. Therefore common features, functions, and elements may not be redundantly described here.

The E-mail-reception process 800 is described below, but processes identical to those of the call reception process 600 will be described in a simple manner.

When the E-mail-reception process 800 is started in the standby state, in task S71, the processor 26 determines whether there is a new-mail alert. Here, the processor 26 determines whether or not a new-mail alert from the E-mail server has been received via the antenna 12 and the wireless communication circuit 14 (receiver module).

If the result of task S71 is "NO" (i.e., if there is no new-mail alert), the processor 26 returns to the same task S71 and stands by until there is a new-mail alert. In other words, the standby state is continued. However, if the result of task S71 is "NO", the processor 26 may return to the process of task S71 after a prescribed time (e.g., 5 minutes) has elapsed). On the other hand, if the result of task S71 is "YES" (i.e., if there is a new-mail alert), in task S73, the processor 26 initializes the volume V and the time interval T (V=Vb1, T=T1).

In the following task S75, the processor 26 determines whether or not the mobile phone 10 is in the back-facing state. If the result of task S75 is "YES", in task S77, the processor 26 sets the volume V to the weak volume Vb2 and also sets the time interval T to the maximum time T2, and proceeds to task S79. On the other hand, if the result of task S75 is "NO", in task S79, the processor 26 determines whether or not manner mode has been set. If the result of task S79 is "YES", in task S81, the processor 26 starts vibrations using the time interval T and proceeds to task S89. On the other hand, if the result of task S79 is "NO", in task S83, the processor 26 determines whether or not silent mode has been set.

If the result of task S83 is "YES", in task S85, the processor 26 sets the volume V to the set volume Vb0 and proceeds to task (S87). On the other hand, if the result of task S83 is "NO", in task S87, the processor 26 starts the output of a ring alert at the volume V and proceeds to task (S89).

In task S89, the processor 26 causes the LED 44 to start blinking. In the following task S91, the processor 26 resets and starts the incoming-call timer 74i. After task S91, the processor 26 proceeds to task S93 as shown in FIG. 9.

In task S93 shown in FIG. 9, the processor 26 determines whether or not there has been an operation to end the incoming-call alert. Here, the processor 26 determines whether or not any of the keys has been operated by the user. Specifically, the processor 26 refers to the operational data buffer 74a and determines whether the key data of the current frame are stored. When any key has been operated by the user, the processor 26 determines that there has been an operation to end the ring alert.

If the result of task S93 is "YES" (i.e., if there has been an operation to end the incoming-call alert), the processor 26 proceeds directly to task S99. On the other hand, if the result of task S93 is "NO" (i.e., if there has been no operation to end the incoming-call alert), in task S95, the processor 26 determines whether or not the mobile phone 10 has been turned over. If the result of task S95 is "YES", the processor 26 proceeds directly to task S99. On the other hand, if the result of task S95 is "NO", in task S97, the processor 26 determines whether or not the prescribed time Tb (incoming-call alert time) has elapsed since the start of the output of the ring alert or the vibrations.

If the result of task S97 is "NO" (i.e., if the prescribed time Tb has not elapsed since the start of the output of the ring alert or the vibrations), the processor 26 returns directly to task S93. On the other hand, if the result of task S97 is "YES" (i.e., if the prescribed time Tb has elapsed since the start of the output of the ring alert or the vibrations), in task S99, the processor 26 stops the output of the ring alert or the vibrations, turns off the LED 44 in task S101, and returns to task S71 shown in FIG. 8.

Figure 10:
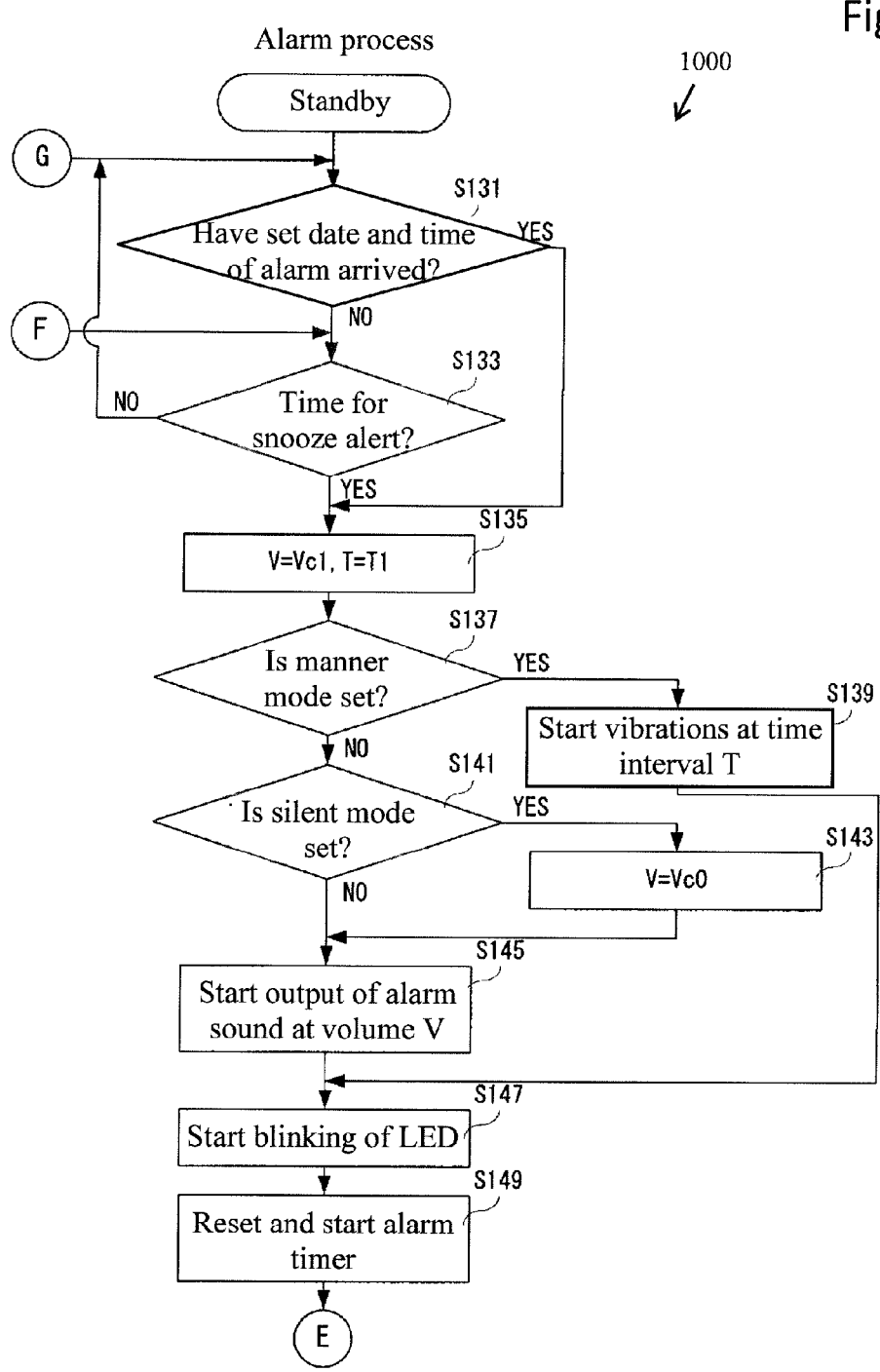
FIGS. 10-11 are illustrations of exemplary flowcharts showing a portion of an alarm process according to an embodiment of the disclosure.
Figure 11:
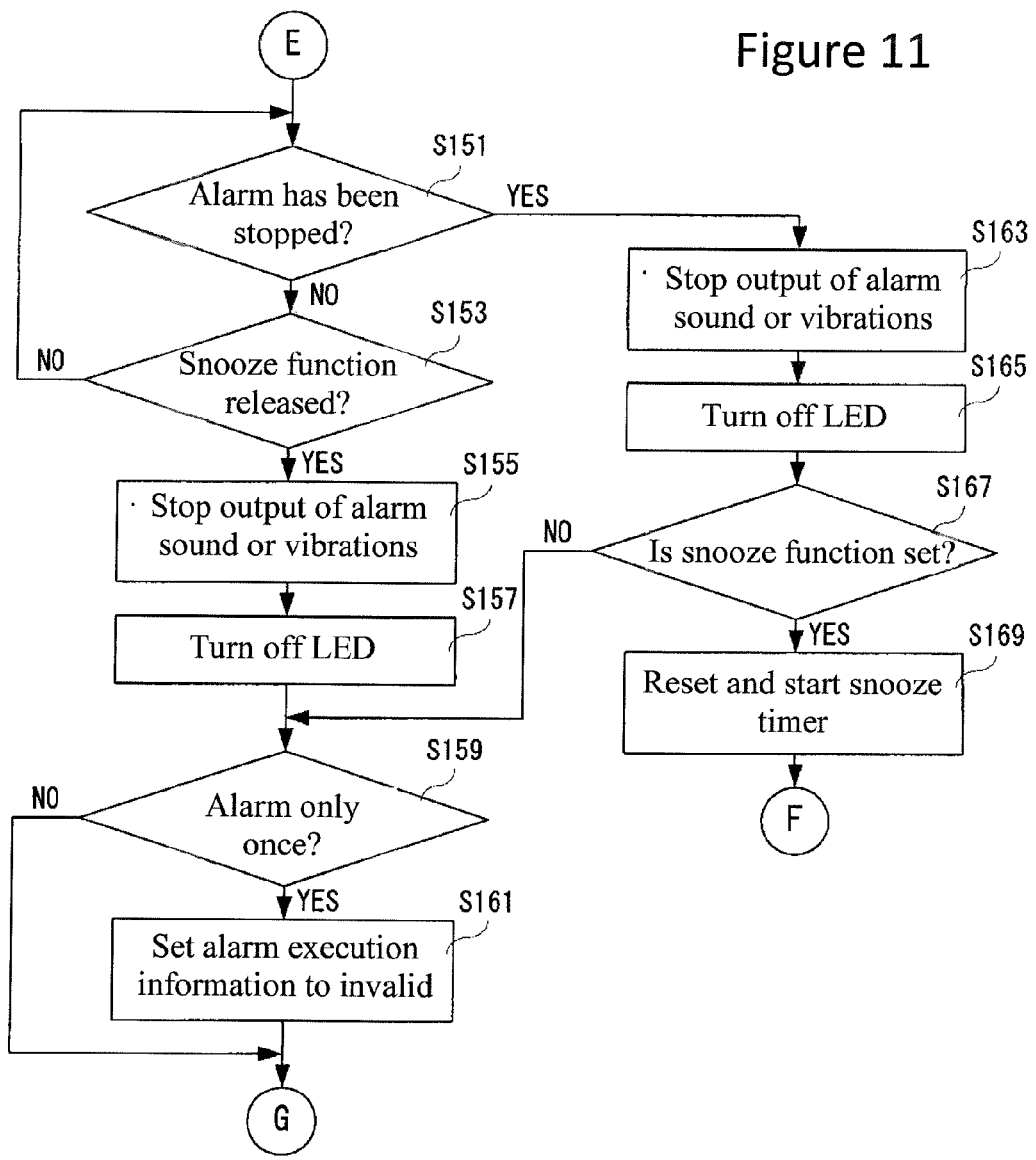

FIGS. 10 and 11 are illustrations of flowcharts showing a portion of an alarm process 1000 that can be performed by the processor 26. The various tasks performed in connection with process 1000 may be performed, by software, hardware, firmware, a computer-readable medium having computer executable instructions for performing the process method, or any combination thereof. The process 1000 may be recorded in a computer-readable medium such as a semiconductor memory, a magnetic disk, an optical disk, and the like, and can be accessed and executed, for example, by a computer CPU such as the processor 26 in which the computer-readable medium is stored.

It should be appreciated that process 1000 may include any number of additional or alternative tasks, the tasks shown in FIGS. 10 and 11 need not be performed in the illustrated order, and process 1000 may be incorporated into a more comprehensive procedure or process having additional functionality not described in detail herein. For illustrative purposes, the following description of process 1000 may refer to elements mentioned above in connection with FIGS. 1-5.

In practical embodiments, portions of the process 1000 may be performed by different elements of the system 10 such as: the processor 26, the wireless communication circuit 14 (receiver module), the A/D converter 16, the D/A converter 20a, the D/A converter 20b, the amplifier 22a, the amplifier 22b, the key input device 28, the display driver 30, the flash memory 34, the memory 100, the acceleration sensor 38, the motor driver 40, the LED 44, the speaker 24a, the speaker 24b, etc. Process 1000 may have functions, material, and structures that are similar to the embodiments shown in FIGS. 1-5. Therefore common features, functions, and elements may not be redundantly described here.

The alarm process will be described below, but processes identical to those of the abovementioned call reception process 600 will be described in a simple manner.

When the alarm process is started in the standby state, in task S131, the processor 26 determines whether or not it is currently the set date and time of an alarm. The processor 26 refers to the alarm settings data 74d and determines whether or not the current clock time (including the date) measured by the RTC (Real Time Clock) 26a matches the date and time indicated in the clock-time information and the date information.

If the result of task S131 is "YES" (i.e., if it is currently the set date and time of an alarm), the processor 26 proceeds to task S135. On the other hand, if the result of task S131 is "NO" (i.e., if it is not currently the set date and time of an alarm), in task S133, the processor 26 determines whether or not it is currently time for a snooze alert. The processor 26 determines whether or not the count value of the snooze timer 74k has reached the time indicated by the snooze interval. If the result of task S133 is "NO" (i.e., if the count value of the snooze timer 74k has not reached the time indicated by the snooze interval), the processor 26 returns to task S131 and stands by until it becomes the set date and time of an alarm or time for a snooze alert. In other words, the standby state is continued. On the other hand, if the result of task S133 is "YES" (i.e., if the count value of the snooze timer 74k has reached the time indicated by the snooze interval), in task S135, the processor 26 initializes the volume V and the time interval T (V=Vc1, T=T1).

In the following task S137, the processor 26 determines whether or not manner mode has been set. If the result of task S137 is "YES", in task S139, the processor 26 starts vibrations using the time interval T and proceeds to task S147. On the other hand, if the result of task S137 is "NO", in task S141, the processor 26 determines whether or not silent mode has been set. If the result of task S141 is "YES", in task S143, the processor 26 sets the volume V to the set volume Vc0 and proceeds to task S145. On the other hand, if the result of task S141 is "NO", in task S145, the processor 26 starts the output of an alarm sound at the volume V and proceeds to task (S147).

Furthermore, in task S145, with the exception of the fact that sound data for the alarm sound are output, the process is identical to that for starting the output of a ring alert in the abovementioned task (S17).

In task S147, the processor 26 causes the LED 44 to start blinking. In the following task S149, the processor 26 resets and starts the alarm timer 74j. After task S149, the processor 26 proceeds to task S151 as shown in FIG. 11.

FIG. 11 is a flowchart continuing from FIG. 10 that shows that alarm process. In the task S151 shown in FIG. 11, the processor 26 determines whether or not the alarm has been stopped. Here, the processor 26 determines whether or not the output time of the alarm sound has reached the alarm time (prescribed time Tc), or whether or not a key has been operated by the user, or whether or not the mobile phone 10 has been turned over. Specifically, the processor 26 determines whether or not the count value of the alarm timer 74j has reached the prescribed time Tc.

Moreover, the processor 26 refers to the operational data buffer 74a and determines whether or not the key data of the current frame are stored. Furthermore, the processor 26 refers to the acceleration data buffer 74b and determines whether or not the acceleration in the Z-axis direction has changed from −g to g, or from g to −g. If any of these conditions is met, the processor 26 determines that the alarm has been stopped, and if none of these conditions is met, the processor 26 determines that the alarm has not been stopped.

If the result of task S151 is "NO" (i.e., if the alarm has not been stopped), in task S153, the processor 26 determines whether or not the snooze function has been released. Here, the processor 26 refers to the operational data buffer 74a and determines whether or not an instruction to release the snooze function has been issued by a user operation of the Cursor key and the Enter key. If the result of task S153 is "NO" (i.e., if the snooze function has not been released), the processor 26 returns directly to task (S151).

On the other hand, if the result of task S153 is "YES" (i.e., if the snooze function has been released), in task S155, the processor 26 stops the output of the alarm sound or the vibrations. In the following task S157, the processor 26 turns off the LED 44. Next, in task S159, the processor 26 determines whether or not the alarm is set to go off only once. In other words, the processor 26 refers to the alarm settings data 74d and determines whether or not the date indicated by the date information is only one day.

If the result of task S159 is "NO" (i.e., if the alarm is not set to go off only once), the processor 26 returns directly to the task S131 shown in FIG. 10. On the other hand, if the result of task S159 is "YES" (i.e., if the alarm is set to go off only once), in task S161, the processor 26 makes the alarm execution information invalid and returns to task S131. However, if the alarm execution information is invalid, the task of this alarm process may be ended.

Moreover, if the result of task S151 is "YES" (i.e., if the alarm has been stopped), in task S163, the processor 26 stops the output of the alarm sound or the vibrations. Next, in task S165, the processor 26 turns off the LED 44. Next, in task S167, the processor 26 determines whether or not the snooze function has been set. In task S167, the processor 26 refers to the alarm settings data 74d and determines whether or not the snooze function is valid.

If the result of task S167 is "NO" (i.e., if the snooze function has not been set), the processor 26 proceeds to task S159. On the other hand, if the result of task S167 is "YES" (i.e., if the snooze function has been set), in task S169, the processor 26 resets and starts the snooze timer 74k and returns to task S135 shown in FIG. 10.

According to the present embodiment, by turning over the mobile phone, the user is able to reduce or stop sounds and vibrations, and therefore, even in locations and cases in which the generation of sounds and vibrations is inappropriate, it is possible to easily reduce or stop sounds and vibrations through intuitive operations. Moreover, turning over the mobile phone only reduces or stops sounds and vibrations and does not cause communication to be disrupted, and therefore, if the user leaves the location or case in which the generation of sounds and vibrations is inappropriate, they are able to directly receive the call and respond. In other words, continuous use is easy.

In the present embodiment, a folding-type mobile phone 10 has been described, but as long as the position or changes in the position of the mobile phone 10 can be detected, the present invention may be applied to a straight-type mobile phone, a sliding-type mobile phone, or a so-called "smartphone".

The present embodiment has been described using hardware such as a key input device, but software keys may be used by providing a touch panel.

In the present embodiment, in response to changes in the acceleration in the Z-axis direction indicated by acceleration data from the acceleration sensor, a determination is made as to whether or not the mobile phone 10 has been turned over, and if it is determined that the mobile phone 10 has been turned over, the output of ring alerts and alarm sounds or vibrations is stopped, or the volume and the intensity of vibrations is reduced, but the present invention is not limited to this. The processor 26 may stop the output of ring alerts and alarm sounds or reduce the volume and the intensity of vibrations if the mobile phone 10 is tilted by a prescribed angle (e.g., 45°) or more or rotated once, or if the mobile phone is lifted up or moved from a resting state.

However, with regard to whether the mobile phone is tilted by a prescribed angle or more, in the state shown in FIG. 2, if the mobile phone is tilted by being rotated about the Y-axis of the coordinate system of the acceleration sensor, in order to determine the position, values or value ranges may be set in advance for the accelerations detected in the X-axis direction and the Z-axis direction.

Moreover, in the state shown in FIG. 2, if the mobile phone is tilted by being rotated about the X-axis of the coordinate system of the acceleration sensor, in order to determine the position, values or value ranges may be set in advance for the accelerations detected in the Y-axis direction and the Z-axis direction. Moreover, it is possible to determine whether or not the mobile phone has been rotated once based on changes in the acceleration in the X-axis direction, Y-axis direction or Z-axis direction.

For example, in the state shown in FIG. 2A, if the mobile phone is rotated once about the Y-axis of the coordinate system of the acceleration sensor, the acceleration in the X-axis direction changes from 0→g (−g)→0→−g (g)→0. At this time, the acceleration in the Z-axis direction changes from −g→0→g→0→−g. The same applies even if the mobile phone is rotated about another axis.

Moreover, if a gyro sensor is provided instead of an acceleration sensor, if a change in angular velocity equivalent to a prescribed value or more from a state in which there is no angular velocity is detected by the gyro sensor, the processor 26 may determine that the position of the mobile phone 10 has been changed.

In the present embodiment, descriptions of the vibrator function have been omitted, but the mobile phone 10 may have a vibration function. If the vibrator function is made valid in normal mode or silent mode, when there is an incoming-call alert or an alarm, the processor 26 may drive the vibration motor, and when the incoming-call alert or alarm ends, the vibration motor may be stopped. Specifically, in the case of the call reception process, the processor 26 starts driving the vibration motor during the same period as the process of task S17, and stops the vibration motor during the same period as the process of task S25 or task S49.

In the case of the E-mail-reception process, the processor 26 starts driving the vibration motor during the same period as the process of task S87, and stops the vibration motor during the same period as the process of task S99. In the case of the alarm process, the processor 26 starts driving the vibration motor during the same period as the process of task S145, and stops the vibration motor during the same period as the process of task S155 or task S163.

In the present embodiment, when a ring alert or vibration is generated in response to an incoming call, if the mobile phone is turned over, the processor 26 reduces the volume of the ring alert or the intensity of the vibrations, but it may stop the output of the ring alert or the vibrations.

In the present embodiment, the intensity of vibrations is changed by keeping the first period during which a drive voltage is applied fixed and changing the second period during which no drive voltage is applied, but the second period may be fixed and the first period may be changed. In this case, the intensity of vibrations is stronger when the first period is longer, and the intensity of vibrations is weaker when the first period is shorter.

Furthermore, the specific values provided in the above descriptions for prescribed times (including time intervals), audio levels, vibration intensities, and accelerations, etc. are all simply examples, and may be changed as appropriate in response to needs related to product specifications, etc.

In this document, the terms "computer program product", "computer-readable medium", and the like may be used generally to refer to media such as, for example, memory, storage devices, or storage unit. These and other forms of computer-readable media may be involved in storing one or more instructions for use by the processor 26 to cause the processor 26 to perform specified operations. Such instructions, generally referred to as "computer program code" or "program code" (which may be grouped in the form of computer programs or other groupings), when executed, enable a method of using a system.

Terms and phrases used in this document, and variations hereof, unless otherwise expressly stated, should be construed as open ended as opposed to limiting. As examples of the foregoing: the term "including" should be read as meaning "including, without limitation" or the like; the term "example" is used to provide exemplary instances of the item in discussion, not an exhaustive or limiting list thereof; and adjectives such as "conventional," "traditional," "normal," "standard," "known" and terms of similar meaning should not be construed as limiting the item described to a given time period or to an item available as of a given time, but instead should be read to encompass conventional, traditional, normal, or standard technologies that may be available or known now or at any time in the future.

Likewise, a group of items linked with the conjunction "and" should not be read as requiring that each and every one of those items be present in the grouping, but rather should be read as "and/or" unless expressly stated otherwise. Similarly, a group of items linked with the conjunction "or" should not be read as requiring mutual exclusivity among that group, but rather should also be read as "and/or" unless expressly stated otherwise.

Furthermore, although items, elements or components of the present disclosure may be described or claimed in the singular, the plural is contemplated to be within the scope thereof unless limitation to the singular is explicitly stated. The presence of broadening words and phrases such as "one or more," "at least," "but not limited to" or other like phrases in some instances shall not be read to mean that the narrower case is intended or required in instances where such broadening phrases may be absent. The term "about" when referring to a numerical value or range is intended to encompass values resulting from experimental error that can occur when taking measurements.

The invention claimed is:

1. A mobile electronic device comprising:
   a notification module operable to output a notification in response to a prescribed event;
   a position detection module operable to detect a change in a position of the mobile electronic device; and
   a notification control module operable to perform one of terminating the notification and reducing a strength of the notification, when the position detection module detects the change in the position of the mobile electronic device while the notification module is outputting the notification;
   a first chassis comprising at least a first surface comprising a display surface and a second surface, wherein
   the change in a position of the mobile electronic device comprises the change of the state from a first state in which the first surface is on the second surface to a second state in which the second surface is on the first surface.

2. The mobile electronic device according to claim 1, wherein:
   the notification module includes a speaker operable to output a notification sound in response to the prescribed event; and
   the notification control module includes a sound control module operable to perform one of terminating the notification sound and reducing a volume thereof, when the position detection module detects the change in the position of the mobile electronic device while the speaker is outputting the notification sound.

3. The mobile electronic device according to claim 2, further comprising:
   a notification-sound setting module operable to set the volume of the notification sound, wherein
   the position detection module detects the position of the mobile electronic device when the prescribed event occurs, and
   the notification-sound control module does not perform outputting the notification sound or reduces the volume of the notification sound set by the notification-sound setting module, when the position detected by the position detection module is a prescribed position.

4. The mobile electronic device according to claim 1, wherein:
   the notification module includes a vibration module operable to vibrate the mobile electronic device in response to the prescribed event; and
   the notification control module includes a vibration control module operable to perform one of deactivating the vibration module and reducing an intensity of the vibration, when the position detection module detects a change in the position of the mobile electronic device.

5. The mobile electronic device according to claim 4, further comprising:
   a vibration-pattern setting module operable to set a pattern of vibration, wherein
   the position detection module also detects the position of the mobile electronic device, when the prescribed event occurs, and
   the vibration control module does not perform activating the vibration module or reduces the intensity of the vibrations adhering to a vibration pattern, when the position detected by the position detection module is a prescribed position.

6. The mobile electronic device according to claim 1, further comprising:
   a receiver module operable to receive a communication request transmitted from another mobile electronic device, wherein
   the prescribed event comprises reception of the communication request.

7. The mobile electronic device according to claim 1, further comprising:
   a receiver module operable to receive an E-mail transmitted from another mobile electronic device, wherein
   the prescribed event comprises reception of the E-mail.

8. The mobile electronic device according to claim 1, further comprising:
   a memory operable to store a first clock time, wherein
   the prescribed event comprises a current clock time matching the first clock time.

9. The mobile electronic device according to claim 1, further comprising:
   an acceleration sensor, wherein
   the position detection module detects a change in the position based on an acceleration detected by the acceleration sensor.

* * * * *